US012651368B2

(12) United States Patent
Al Rashdan et al.

(10) Patent No.: US 12,651,368 B2
(45) Date of Patent: Jun. 9, 2026

(54) UNMANNED VEHICLE NAVIGATION, AND ASSOCIATED METHODS, SYSTEMS, AND COMPUTER-READABLE MEDIUM

(71) Applicants:Battelle Energy Alliance, LLC, Idaho Falls, ID (US); University of Idaho, Moscow, ID (US)

(72) Inventors: Ahmad Y. Al Rashdan, Ammon, ID (US); Michael L. Wheeler, Greenwood, IN (US); Roger Lew, Moscow, ID (US); Dakota Roberson, Shelley, ID (US); Lloyd M. Griffel, Idaho Falls, ID (US); Roger Boza, Miami, FL (US); Michael W. Thompson, Bokeelia, FL (US)

(73) Assignees: Battelle Energy Alliance, LLC, Idaho Falls, ID (US); University of Idaho, Moscow, ID (US)

( * ) Notice: Subject to any disclaimer, the term of this patent is extended or adjusted under 35 U.S.C. 154(b) by 338 days.

(21) Appl. No.: 17/755,878

(22) PCT Filed: Nov. 13, 2020

(86) PCT No.: PCT/US2020/060473
§ 371 (c)(1),
(2) Date: May 11, 2022

(87) PCT Pub. No.: WO2021/141666
PCT Pub. Date: Jul. 15, 2021

(65) Prior Publication Data
US 2022/0383541 A1 Dec. 1, 2022

Related U.S. Application Data

(60) Provisional application No. 62/934,976, filed on Nov. 13, 2019.

(51) Int. Cl.
*G06T 7/73* (2017.01)
*G06K 7/14* (2006.01)
(Continued)

(52) U.S. Cl.
CPC .............. *G06T 7/73* (2017.01); *G06K 7/1413* (2013.01); *G06K 7/1417* (2013.01); *G06T 7/50* (2017.01);
(Continued)

(58) Field of Classification Search
CPC .......... G06V 10/74; G06F 18/22; G06T 7/50; G05D 1/2446; G05D 1/0231; G05D 1/0234
See application file for complete search history.

(56) References Cited

U.S. PATENT DOCUMENTS 9,964,951 B1 * 5/2018 Dunn ................... G06V 10/245
11,249,492 B2 * 2/2022 Zamora Esquivel .. G06V 20/10
(Continued)

FOREIGN PATENT DOCUMENTS

WO 2016/187757 A1 12/2016
WO 2019/092418 A1 5/2019
(Continued)

OTHER PUBLICATIONS

International Search Report for International Application No. PCT/US20/60473, mailed Jun. 29, 2021, 2 pages.
(Continued)

*Primary Examiner* — Dino Kujundzic
(74) *Attorney, Agent, or Firm* — TraskBritt

(57) ABSTRACT

Various embodiments relate to unmanned vehicle navigation. A navigation system may include one or more processors configured to communicatively couple with an unmanned vehicle. The one or more processors may be configured to receive an image from the unmanned vehicle
(Continued)

and detect a feature within the image. The one or more processors may be further be configured to determine a location of the unmanned vehicle based on the feature and convey one or more commands to the unmanned vehicle based on the location of the unmanned vehicle. Associated methods and computer-readable medium are also disclosed.

20 Claims, 24 Drawing Sheets

(51) Int. Cl.
    *G06T 7/50*          (2017.01)
    *B64U 101/31*      (2023.01)

(52) U.S. Cl.
    CPC ............ *G06T 7/74* (2017.01); *B64U 2101/31* (2023.01); *G06T 2207/10032* (2013.01); *G06T 2207/20081* (2013.01); *G06T 2207/30204* (2013.01)

(56) References Cited

U.S. PATENT DOCUMENTS

| | | | | |
|---|---|---|---|---|
| 11,656,090 | B2 * | 5/2023 | Soni | G06V 20/56 |
| | | | | 701/428 |
| 12,181,892 | B2 * | 12/2024 | Kojima | G08G 5/21 |

| | | | | |
|---|---|---|---|---|
| 2005/0125142 | A1 * | 6/2005 | Yamane | G05D 1/0676 |
| | | | | 701/510 |
| 2013/0231779 | A1 | 9/2013 | Purkayastha et al. | |
| 2016/0124431 | A1 * | 5/2016 | Kelso | G06K 19/06056 |
| | | | | 701/28 |
| 2016/0321530 | A1 * | 11/2016 | Troy | G06Q 10/02 |
| 2018/0203467 | A1 * | 7/2018 | Zhou | G06V 20/13 |
| 2018/0301045 | A1 * | 10/2018 | Pesik | G06V 10/145 |
| 2018/0373950 | A1 * | 12/2018 | Gong | G06V 10/22 |
| 2019/0156086 | A1 * | 5/2019 | Plummer | G06T 7/248 |
| 2019/0235531 | A1 * | 8/2019 | Liu | G05D 1/102 |
| 2019/0265721 | A1 * | 8/2019 | Troy | G01C 21/20 |
| 2020/0005832 | A1 * | 1/2020 | Ko | G06T 7/70 |
| 2020/0301445 | A1 * | 9/2020 | Jourdan | G06K 19/06037 |
| 2020/0349362 | A1 * | 11/2020 | Maloney | G01C 21/3848 |

FOREIGN PATENT DOCUMENTS

| | | | |
|---|---|---|---|
| WO | 2019/174213 | A1 | 9/2019 |
| WO | 2021/091989 | A1 | 5/2021 |

OTHER PUBLICATIONS

International Written Opinion for International Application No. PCT/US20/60473, mailed Jun. 29, 2021, 6 pages.

Redmon et al., "YOLOv3: An Incremental Improvement", arXiv:1804. 02767v1 [cs.CV] (Apr. 8, 2018), 6 pages.

\* cited by examiner

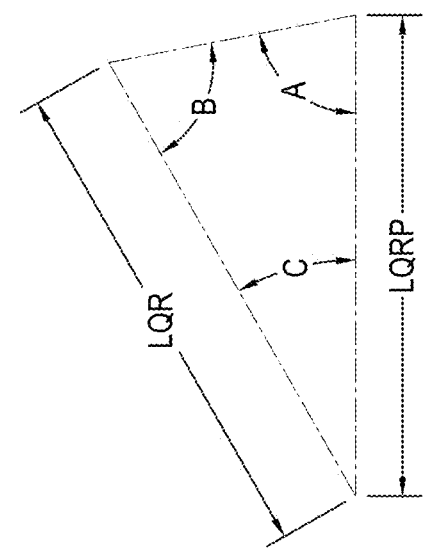
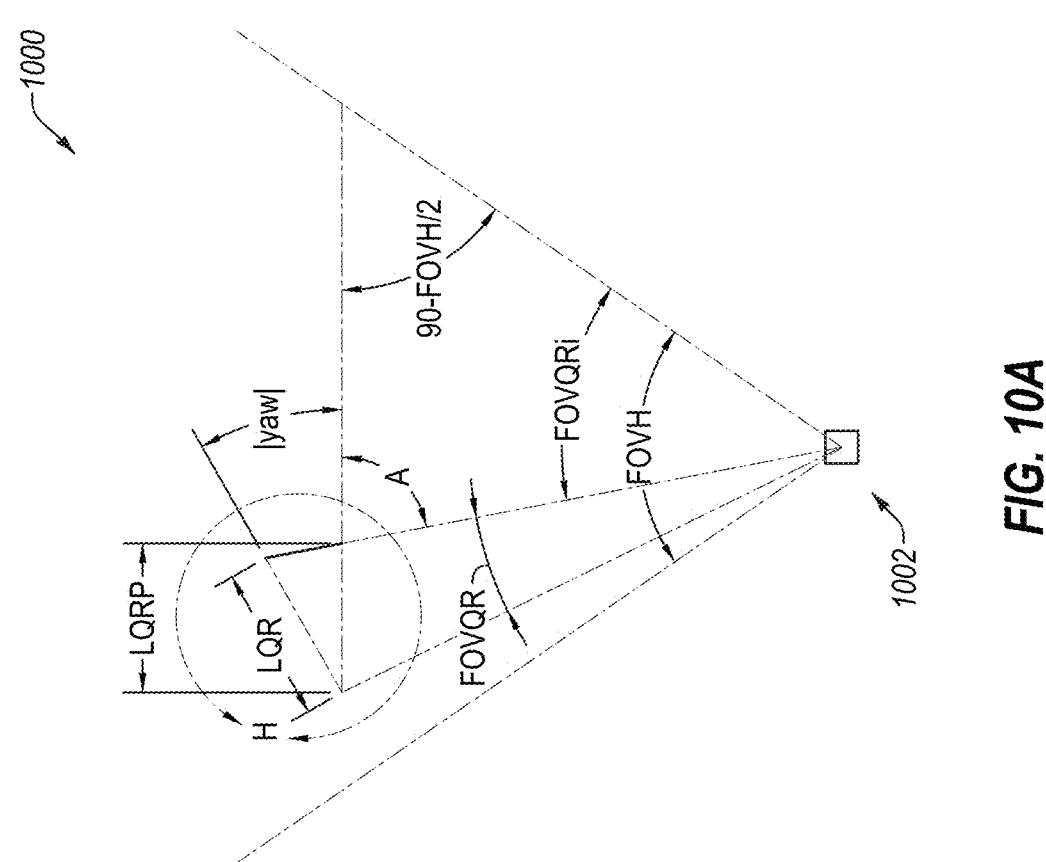
*FIG. 10B*
*FIG. 10A*

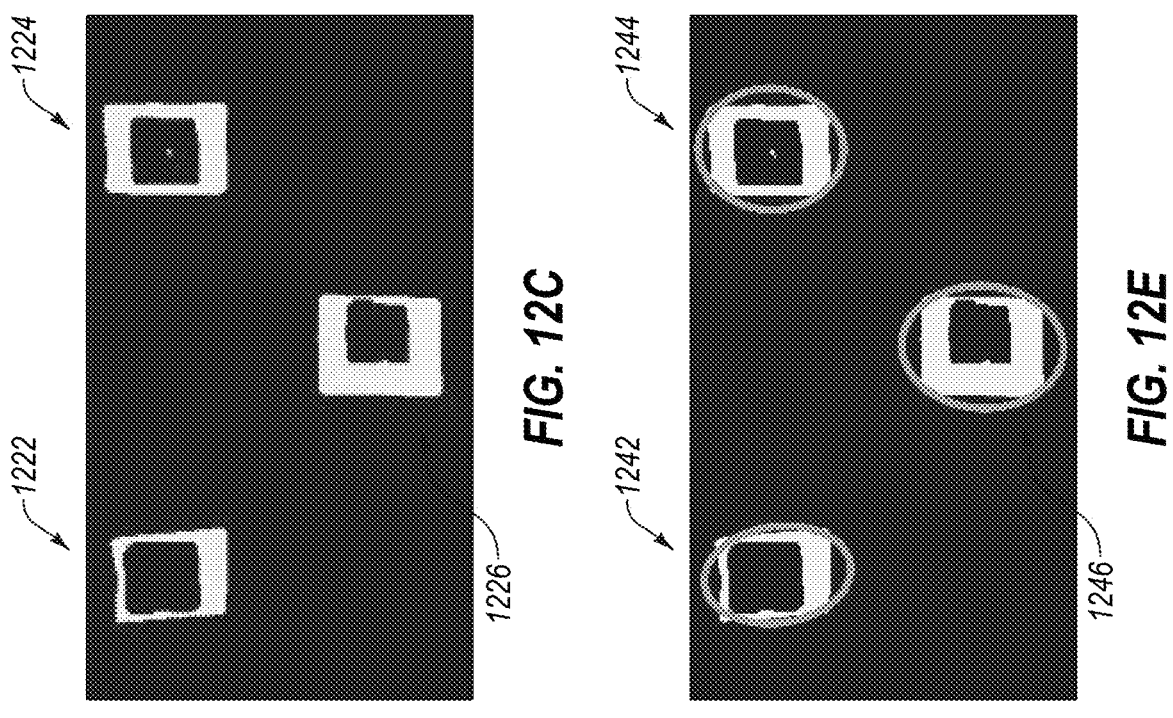
FIG. 12C
FIG. 12E
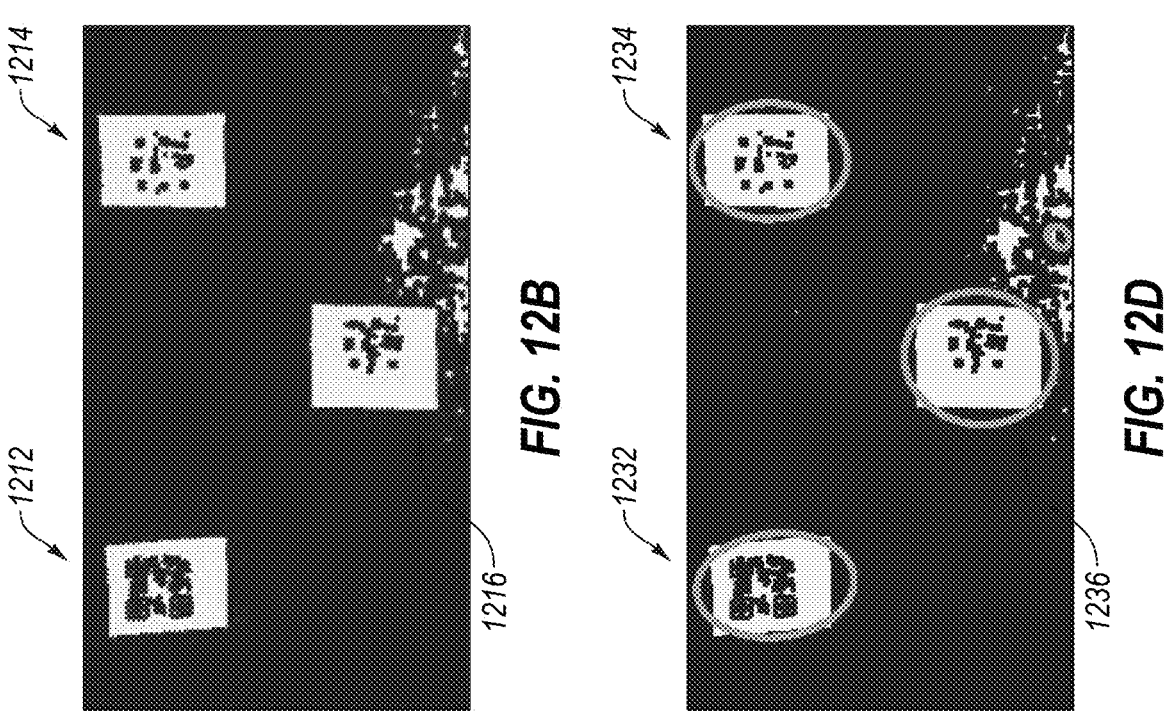
FIG. 12B
FIG. 12D

1260

1250

1264
1204

1266
1206

1262
1202

UNMANNED VEHICLE NAVIGATION, AND ASSOCIATED METHODS, SYSTEMS, AND COMPUTER-READABLE MEDIUM

CROSS-REFERENCE TO RELATED APPLICATIONS

This application is a national phase entry under 35 U.S.C. § 371 of International Patent Application PCT/US2020/060473, filed Nov. 13, 2020, designating the United States of America and published as International Patent Publication WO 2021/141666 A2 on Jul. 15, 2021, which claims the benefit under Article 8 of the Patent Cooperation Treaty to U.S. Provisional Patent Application Ser. No. 62/934,976, filed Nov. 13, 2019, for "Image-Driven Self-Navigation of Drones in Indoor Environments." This application also claims the benefit of the filing date of U.S. Provisional Patent Application Ser. No. 63/090,645, filed Oct. 12, 2020, for "Route-Operable Unmanned Navigation of Drones (ROUNDS)."

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

FIELD

Embodiments of the present disclosure relate generally to unmanned vehicle navigation, and more specifically to systems, methods, and computer-readable medium for navigating an unmanned vehicle within and/or around an environment via a number of visual features. Yet more specifically, some embodiments relate to an autonomous navigation system for navigating a vehicle within and/or around an environment via a number of image-based codes.

BACKGROUND

Unmanned vehicles, which are also referred to as uncrewed vehicles or autonomous vehicles (e.g., remotely piloted aircraft systems (RPAS), unmanned aerial vehicles, autonomous aircraft, remotely piloted vehicles (RPVs), drones, and the like), are vehicles without an on-board human. Some unmanned vehicles are used is military applications such as, for example, surveillance, cargo delivery, bombing, and air support. Unmanned vehicles have also been used in non-military roles such as, delivering cargo and packages, aerial photography, geographic mapping, search and rescue, disaster management, agriculture management, wildlife monitoring, law enforcement surveillance, construction management, and storm tracking.

BRIEF SUMMARY

One or more embodiments of the present disclosure include a system. The system may include one or more processors configured to communicatively couple with an unmanned vehicle. The one or more processors may be configured to receive an image from the unmanned vehicle positioned within an environment and detect one or more features inserted into the environment and depicted in the image. The one or more processors may be further be configured to determine a location of the unmanned vehicle based on the one or more features and convey one or more commands to the unmanned vehicle based on the location of the unmanned vehicle.

One or more embodiments of the present disclosure include a method. The method may include positioning a number of features within an environment. The method may also include receiving an image from a vehicle positioned within or proximate to the environment. The method may also include detecting at least one feature of the number of features within the image. Further, the method may include determining a location of the vehicle based on the at least one feature. The method may further include conveying one or more commands to the vehicle based on the location of the vehicle.

Other embodiments may include a non-transitory computer-readable medium including computer-executable instructions that, when executed, perform acts. The acts include detecting at least one feature inserted into an environment and depicted within an image captured via a vehicle within or proximate to the environment. The acts may also include decoding information stored in the at least one feature. The acts may further include determining a location of the vehicle relative to the at least one feature. The acts may further include conveying one or more control signals to the vehicle based on the location of the vehicle and the information stored in the at least one feature.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIGS. 10A-10E depict various example geometries, which may be used in accordance with various embodiments of the present disclosure;

FIGS. 12B and 12C depict example filter outputs including a number of codes, according to various embodiments of the present disclosure;

FIGS. 12D and 12E depict example regions of interests including codes, in accordance with various embodiments of the present disclosure;

DETAILED DESCRIPTION

Figure 1:
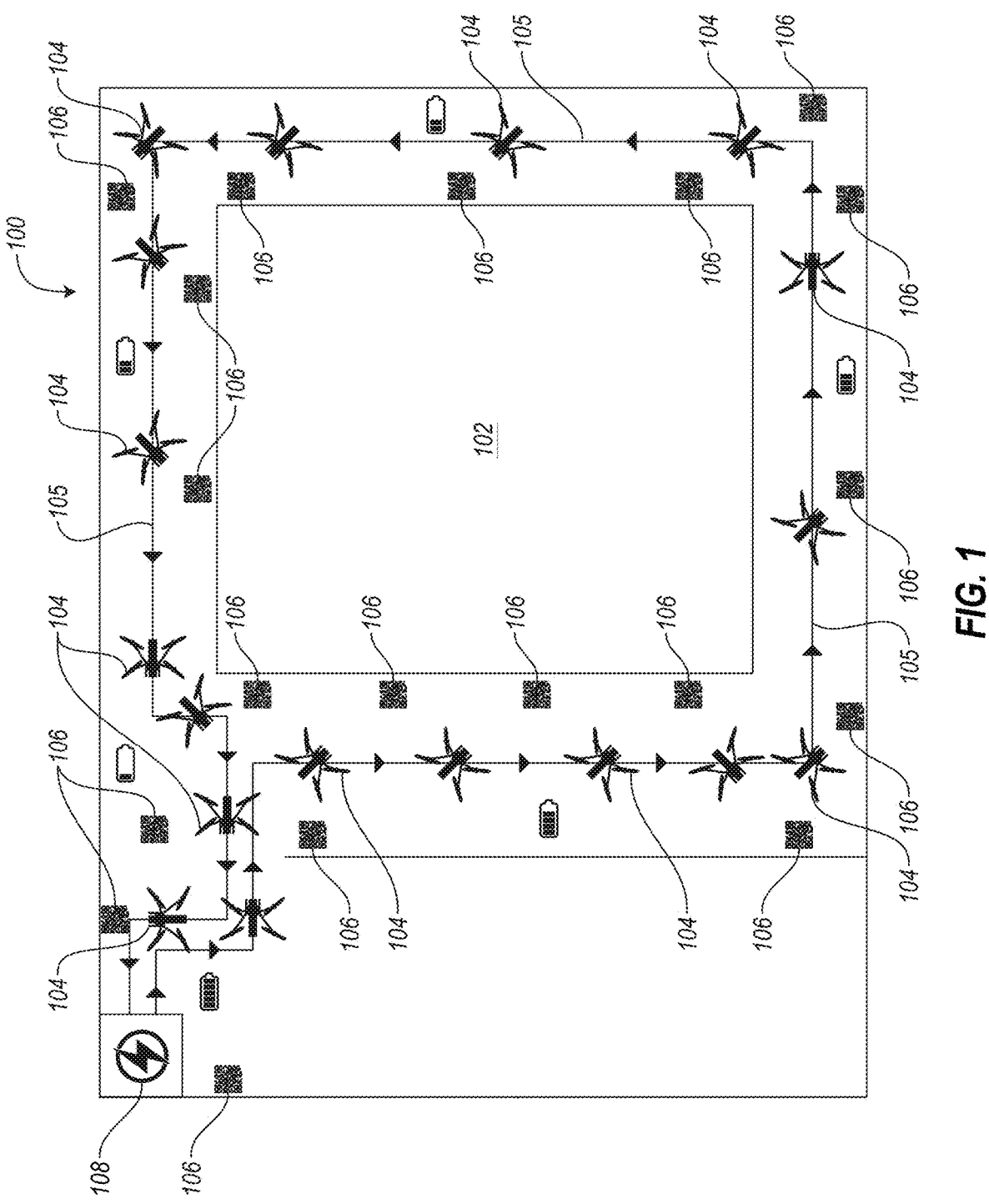
FIG. 1 illustrates an example environment, including a vehicle and a number of visual features, in which one or more embodiments of the present disclosure may be configured to operate.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As noted above, unmanned vehicles (e.g., drones) have been used in, for example, recreational, professional, and military applications. For successful navigation, conventional drone technologies rely on a strong global positioning system (GPS) signal (i.e., for position information) and a compass (e.g., for heading information). GPS may be unreliable or unavailable in some environments (e.g., indoor environments, such as inside industrial facilities or other indoor environments), and therefore conventional drone technologies may not be an option for indoor environments.

Various embodiments described herein relate to navigation of unmanned vehicles, and more specifically to, for example, navigation of unmanned vehicles within non-GPS environments. According to various embodiments described more fully herein, a vehicle (e.g., a drone) may be configured to capture (e.g., via a camera) a number images positioned at specific locations throughout an environment, wherein each image may include one or more features (e.g., visual features (e.g., codes, such as quick response codes (QR codes) or bar codes) and/or non-visual features of any suitable shape and/or size). According to various embodiments, the one or more features, which may include known sizes, colors, patterns, and/or shapes, may be inserted into the environment (e.g., and positioned at desired locations). Images may be processed (i.e., via one or processors) and used to guide the vehicle along a desired route of the environment. More specifically, for example, one or more processors may be configured to receive an image from a vehicle, detect one or more codes in the image, decode the one or more codes, determine a location of the vehicle based on the one or more codes, and control the vehicle based on the location of the vehicle.

As will be appreciated, various embodiments disclosed herein may have various real-word applications. For example, various embodiments may be used for surveillance, data collection, and/or performance of various tasks within, for example, a non-GPS environment (e.g., an indoor environment, such as a nuclear power plant). Further, various embodiments of the present disclosure may allow for automation of activities within an environment. For example, in accordance with various embodiments, a vehicle may perform periodic inspections and surveys and/or perform operator and security rounds. Further, in some embodiments, a vehicle may be outfitted with tooling, sensors, and/or other devices and/or materials to enter areas that are hazardous to humans to perform tasks (e.g., inspections or other procedures). Also, a vehicle may be able to transport resources (e.g., materials, tools, documents) to and from a work site. Moreover, a vehicle may be configured to survey radiation fields and complement humans to expedite tasks (e.g., enable supervisors, schedulers, and reviewers to remotely verify work progress).

According to some embodiments, various navigation systems described herein may be used to supplement and/or augment other (e.g., known) navigation methods, such as, for example only, simultaneous localization and mapping (SLAM), target tracking, and/or GPS (e.g., to increase accuracy and/or increase performance) (e.g., during at least part of a route). For example, various embodiments may relate to using a first navigation system (e.g., SLAM, target tracking, GPS, etc.) during some parts of a navigation process and using a different navigation system (i.e., according to various embodiments described more fully below) during different parts of the navigation process. More specifically, for example, a method may include alternating use of, for example, SLAM or another known navigation systems, and a navigation system according to various embodiments, as described more fully herein.

Although various embodiments of the present disclosure are described with reference to flying unmanned aerial vehicles (e.g., flying drones), as used herein a "vehicle" or a "drone" includes, but is not limited to, air, land, or water vehicles. A vehicle may include one or more cameras, including installed, integrated, or added cameras. Further, although various embodiments are described with reference to indoor environments, various embodiments may be utilized in outdoor environments. Moreover, although various embodiments are described with reference to codes, the present disclosure is not so limited, and any visual or non-visual feature (e.g., with known size, location, and orientation, and positioned (e.g., at intervals) throughout an environment) may be used for navigation. For example, in some embodiments, a feature may include a marker such as infrared or ultra-violate marker (e.g., detectable via an infrared or ultra-violate camera). In other embodiments, a feature may include a visual feature (e.g., a code) such as a QR code or a bar code.

Various embodiments of the present disclosure will be described generally with reference to FIGS. 1-5. Further, a first implementation of unmanned vehicle navigation will be described with reference to FIGS. 1-11, 16, and 17. Moreover, a second, different implementation of unmanned vehicle navigation will be described with reference to FIGS. 1-5 and 12A-17.

FIG. 1 illustrates an example system 100 for navigating at least a portion of an environment 102, in accordance with one or more embodiments of the present disclosure. System 100 includes a vehicle 104, which may include, for example only, an unmanned vehicle (e.g., an unmanned aerial vehicle (UAV), such as a drone). System 100 further includes a number of visual features 106, which may include a code, such as a QR code, for example. System 100 also includes a point (also referred to herein as a "nest") 108, which may include a start/finish point. According to some embodiments, point 108 may include a charging pad for charging vehicle 104. In some embodiments, vehicle 104 may include charging pins such that vehicle 104 may establish electrical contact upon landing on or near point 108. According to some embodiments, a dedicated-charging graphical user interface (GUI) for determining a charging status of vehicle 104 may be provided.

According to various embodiments described herein, vehicle (also referred to herein as "drone") 104 may travel from point 108 around and/or through at least a portion of environment 102 (e.g., along a preconfigured route 105) and return to point 108. Further, vehicle 104 may be configured to capture (e.g., via a camera of vehicle 104) visual features (e.g., codes, such as QR codes) 106 positioned at preconfigured locations within and/or proximate environment 102 to guide vehicle 104 on route 105 around and/or through environment 102.

As described more fully below, upon a visual feature 106 being positioned in a field of view (FOV) of a camera of vehicle 104, visual feature 106 may identified, extracted from an image, decoded (i.e., for its data (i.e., to map it to a location (e.g., as stored in a table and/or database) or provide additional route instructions)). For example, visual feature 106 may provide general localization data such as what building or hallway vehicle 104 is positioned and/or a route that vehicle 104 should fly after detecting and decoding the associated visual feature 106. Further, visual feature 106 may analyzed to determine a location of vehicle 104 with respect to the associated visual feature 106. More specifically, for example, by comparing known dimensions of visual feature 106 to its representation in the image, it may be possible to determine a precise location of vehicle 104 (e.g., within a centimeter). Further, based on the location of vehicle 104, one or more commands may be conveyed to vehicle 104 for controlling operation thereof.

According to various embodiments, vehicle 104 may be configured to receive commands synchronously and asynchronously. In some embodiments, vehicle 104 may couple to a controller (e.g., a host computer) (e.g., via Wi-Fi), which may be configured to send and receive signals to and from vehicle 104. For example, vehicle 104 may be configured to receive x, y, and z translations (e.g., in meters) that correspond to directional moves, as well as a yaw command that allows vehicle 104 turn on its central axis to face different directions. Vehicle 104 may be configured to move specified distances in loop (e.g., a closed loop) control. Vehicle 104 may receive roll (strafe left to right), pitch (forward and backward), yaw (rotate left and right), and Gaz (rise and fall) values, wherein these values that may vary from 0% to 100% power or speed in either direction and may be limited if vehicle 104 is in a sensitive area. In some embodiments, vehicle 104 may be configured to move for as long as vehicle 104 receives a command.

Further, according to various embodiments, vehicle 104 may be configured to hover in a specified locations (e.g., with a location accuracy in the order of 1 inch). Moreover, a vehicle 104 may fly without compromising flight stability and may provide robustness to accidental contact.

Figure 2:
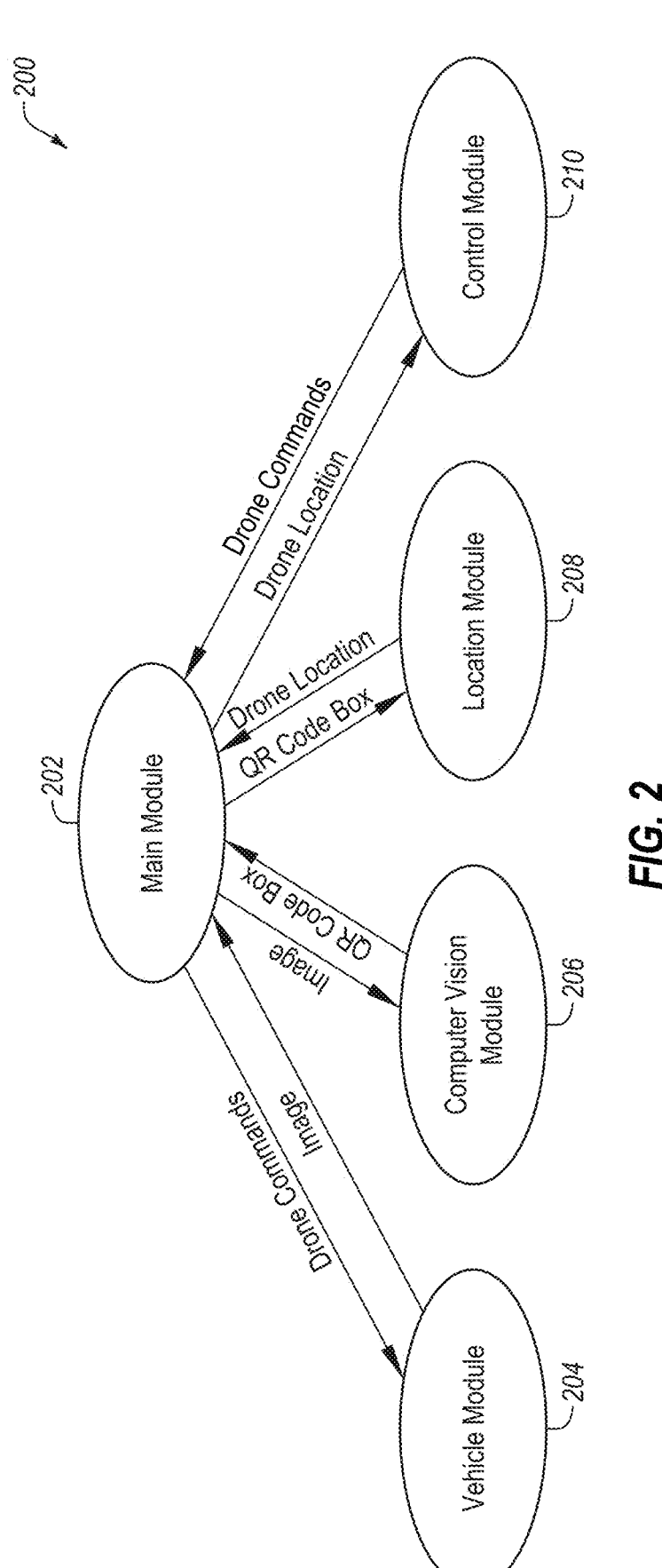
FIG. 2 depicts an example system including a number of modules, in accordance with various embodiments of the present disclosure.

FIG. 2 depicts an example system 200 including a number of modules, in accordance with various embodiments of the present disclosure. System 200 includes a main module 202 coupled to each of a vehicle module 204, a computer vision module 206, a location module 208, and a control module 210. For example, main module 202, vehicle module 204, computer vision module 206, location module 208, and/or control module 210 may be implemented as one or more software modules (e.g., as part of a software package).

Generally, system 200 may be configured to detect visual features in an image of a video stream provided by a vehicle, determine a location of the vehicle based on metrics derived from a visual feature and distortion within the image, and navigate the vehicle (i.e., via a number of commands) based on the location of the vehicle (i.e., relative to the visual feature).

During one contemplated operation, in response to flight initialization (e.g., after a take-off command), main module 202 may receive an image from vehicle module 204 (i.e., including a vehicle) and convey the image to computer vision module 206. Further, as described more fully below, computer vision module 206 may detect a code (e.g., a QR code) in the image, generate a bounding box around the code, and convey the code including the bounding box to main module 202. Further, the bounding box and the code may be conveyed from main module 202 to location module 208, which, as described more fully below, may use data associated with the code and the code view in the image to calculate a position of the vehicle relative to the code. Further, the position of the vehicle relative to the code in the image may be conveyed to control module 210, which, as described more fully below, may use the location information to convey one or more commands to vehicle module 204 for controlling the vehicle (e.g., for controlling a roll, pitch, yaw, and/or thrust of the vehicle). This cycle may be repeated (e.g., at a sub-second frequency) until the vehicle reaches a predetermined waypoint (e.g., as represented by a set of coordinates relative to the code). In some embodiments, main module 202 may not be necessary and, in these embodiments, vehicle module 204, computer vision module 206, location module 208, and control module 210 may communicate with one another as necessary.

Figure 3:
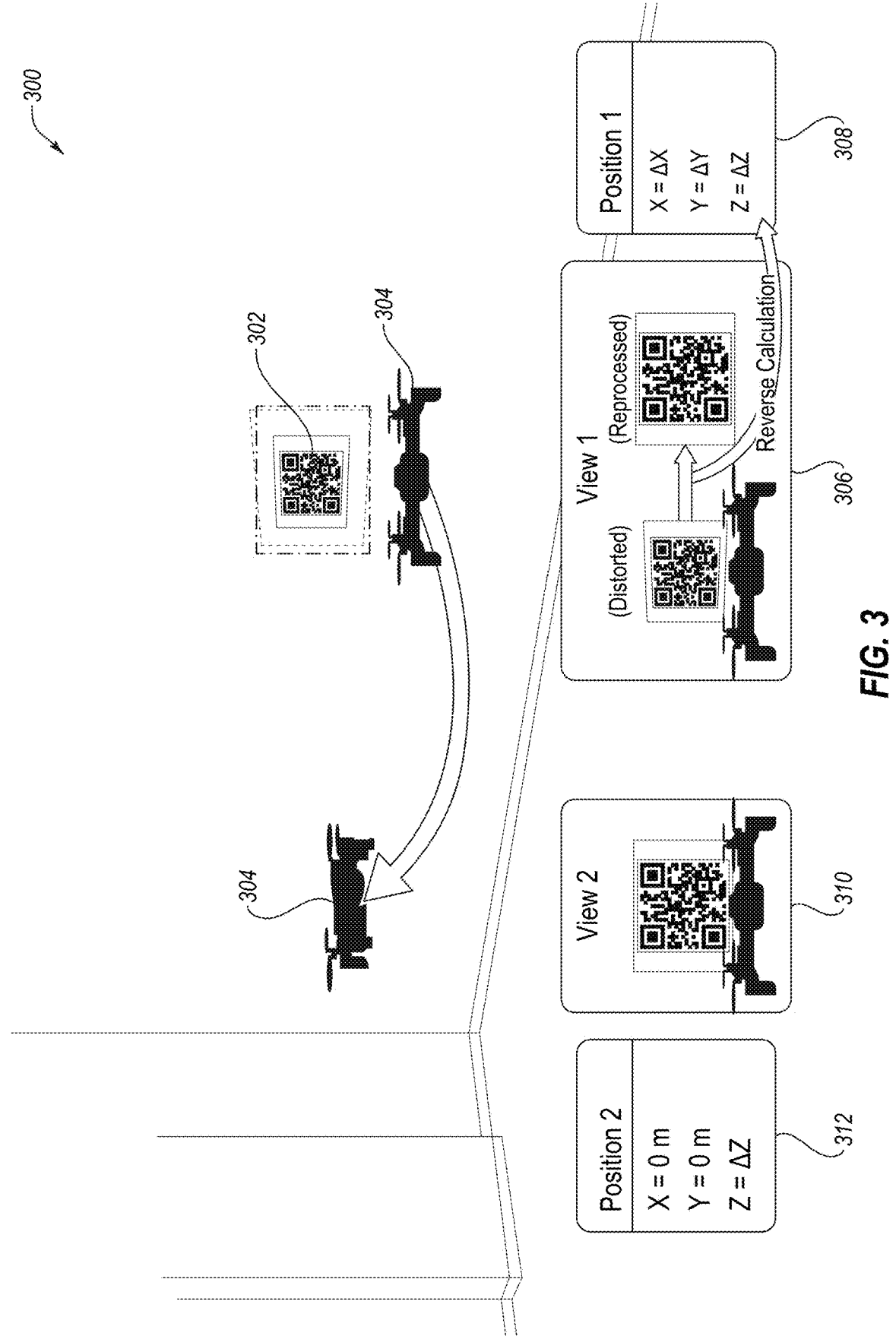
FIG. 3 depicts a code and a vehicle in a number of positions relative the code, in accordance with various embodiments of the present disclosure.

FIG. 3 illustrates an environment 300 including a QR code 302 and a vehicle 304 in a number of positions relative to QR code 302. Further, FIG. 3 shows a first view 306 of QR code 302 taken from an actual location of vehicle 304 at a first position (e.g., X=ΔX, Y=ΔY, Z=ΔZ) 308 and a second view 310 taken from vehicle 304 at a known second position (e.g., X=0 m, Y=0 m, Z=ΔZ) 312 facing QR code 302 (i.e., a known face-on position (i.e., only displaced from QR code 302 in one (e.g., Z) dimension)). As described more fully below, by determining a displacement and angle between first position 308 and the known second position 312, a location of vehicle 304 (i.e., at first position 308) relative to QR code 302 may be determined. In other words, as described more fully below, image deformation may be used to identify the actual position of vehicle 304 relative to QR Code 302. In other embodiments, a view of QR code 302 may be used independently of other views or codes to determine a location of vehicle 304. Further, in some embodiments, a location of a code in one frame may be used to determine where to look for the code in a subsequent frame.

Figure 4:
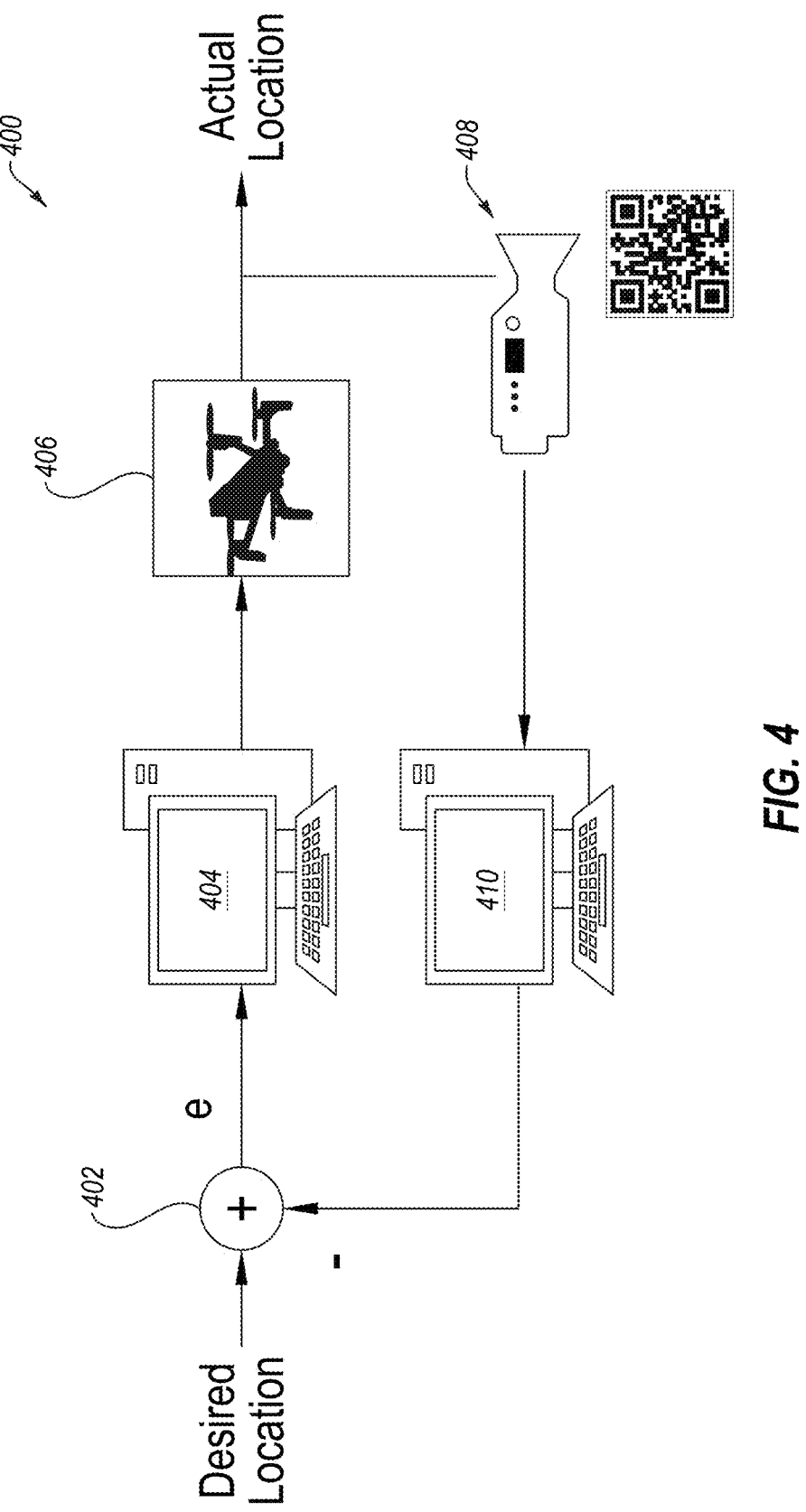
FIG. 4 depicts an example control loop, according to various embodiments of the present disclosure.
Figure 5:
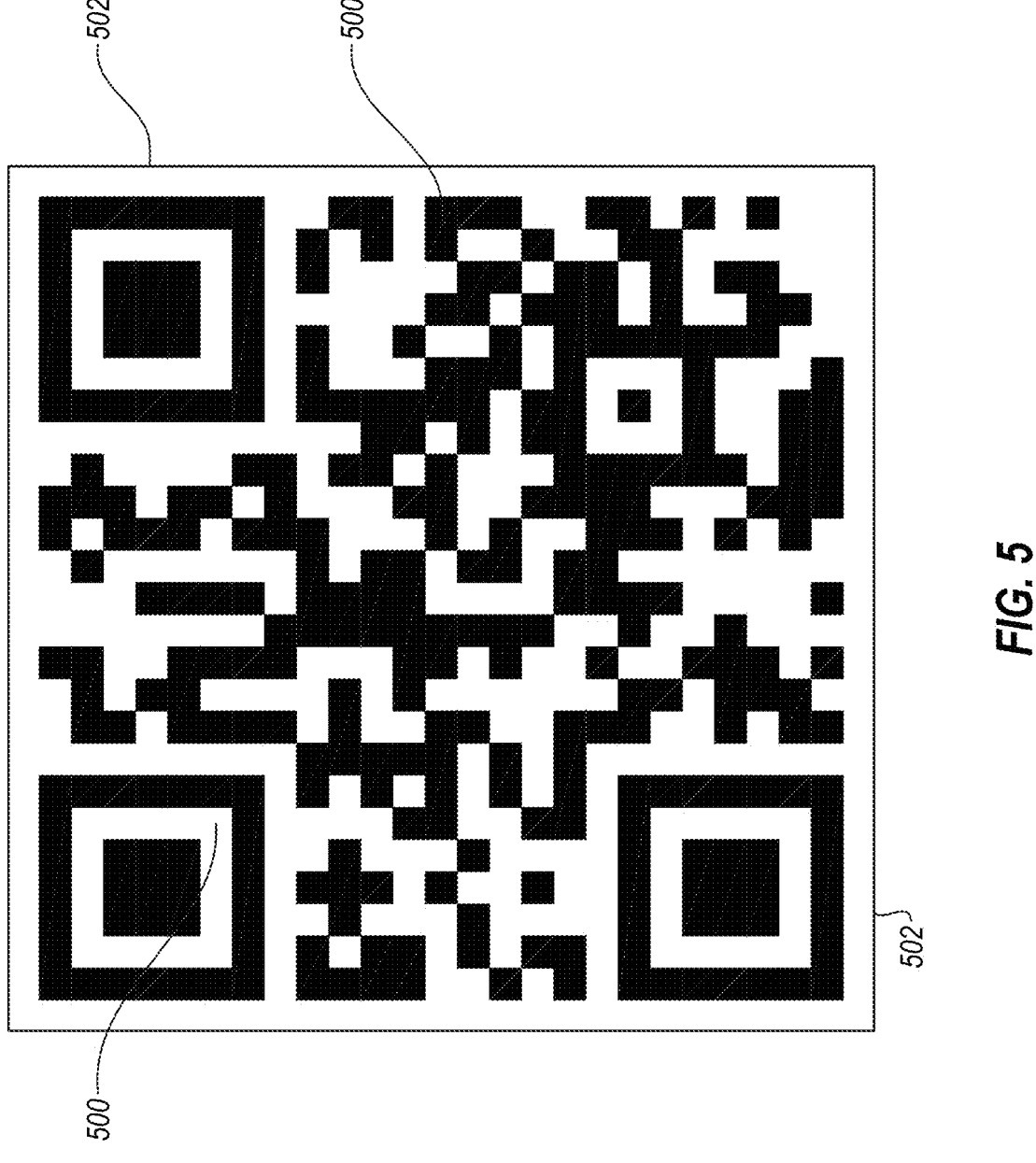
FIG. 5 depicts a code and a bounding box, according to various embodiments of the present disclosure.

Furthermore, utilizing a control loop, vehicle 104 (see FIG. 1) may be moved from a known actual position to a desired location (e.g., the next location along a route) within an environment. With reference to FIG. 4, a control loop 400, according to various embodiments, is illustrated. Control loop 400 includes a comparison node 402, a processor 404, a vehicle 406, a vision unit 408, and a processor 410. Vision unit 408 and processor 410 may collectively be referred to as a "sensor loop" or "control loop." For example, processor 404 and processor 410 may be a single processor or more than one processor. For example, processor 404 and/or processor 410 may include or may be part of control module 210, location module 208, and/or computer vision module 206 of FIG. 2. Further, vehicle 406 may include or may be part of vehicle module 204 of FIG. 2 and/or vision unit 408 may include or may be part of computer vision module 206 of FIG. 2.

During a contemplated operation, vision unit 408 may detect a code (e.g., a QR code) in an image provided by vehicle 406 and convey the code to processor 410, which may determine the actual location of vehicle 406 based on the code. More specifically, processor 410 may be configured to calculate a relative distance from vehicle 406 to the code. Further, summation node 402 may be configured to receive a desired location for vehicle 406 and the actual location of vehicle 406 (e.g., from processor 410). Further, summation node 402 may provide an error value to processor 404, which may provide one or more commands to vehicle 406 based on the error value. More specifically, processor 404 may convey one or more commands to vehicle 406 for controlling one or more of a roll motion, a pitch motion, a yaw motion, and/or thrust of vehicle 406 in a number of (e.g., all) directions.

This process may be continuously repeated until the actual position of vehicle 406 is within a certain threshold from the desired location. Further, in response to the actual position of vehicle 406 be within a certain threshold from the desired location, vehicle 406 may execute an arbitrary task (e.g., hover for several seconds, take a high-resolution photo, or pivot a certain amount so that the next code is within view).

Further, in some examples, vehicle 406 may receive instruction regarding the next location in the route. More specifically, the next location, or waypoint, may be provided to vehicle 406 (e.g., via processor 404). Further, in some embodiments, instructions and/or other information may be incorporated in a feature. For example, a route location or waypoint may include the following parts: (1) where vehicle 406 needs to fly with respect to the visual feature in view (given in a Cartesian coordinate system), (2) a minimum distance vehicle 406 must get to (i.e., from the waypoint) (3) a number of updates, or frames processed, during which vehicle 406 calculates that vehicle 406 is hovering (e.g., stably) within a waypoint tolerance (e.g., 0.1 meters), (4) an action or maneuver vehicle 406 may take once vehicle 104 has arrived (e.g., stably) at the waypoint.

For example, vehicle 406, which may include vehicle 104 of FIG. 1, may have a waypoint set at N meters (e.g., 2 meters) directly in front of a visual feature with a low tolerance of M meters (e.g., 0.1 meters) and P (e.g., 10) stable updates, ensuring vehicle 104 is in a precise location and hovering steadily. Once the Pth (e.g., $10^{th}$) stable update is achieved, a task may be performed to turn vehicle 104 (e.g., by a certain angle) and fly (e.g., "blindly") for a distance (e.g., a few feet) before detecting the next visual feature. Or in some cases, a visual feature may be positioned directly in front of point 108 (see FIG. 1), and action item may be performed to land vehicle 104 at point 108.

As noted above, a first implementation of unmanned vehicle navigation will be described with reference to FIGS. 1-11, 16, and 17. Generally, in the first implementation, after leaving point 108 (see FIG. 1), vehicle 104 may acquire (i.e., via a camera) video and/or a number of images within environment 102. Upon detecting a visual feature 106 in the field of view (FOV) of a camera of vehicle 104, visual feature 106 is identified in an image, a bounding box is positioned around visual feature 106 in the image (e.g., see FIG. 5 including visual feature 500 and bounding box 502), visual feature 106 is extracted out of the image, visual feature 106 is decoded for its data (e.g., to map visual feature 106 to a location or provide additional route instructions), and visual feature 106 and its bounding box may be analyzed to determine the location of vehicle 104 with respect to the associated visual feature 106.

As noted above, a feature (e.g., visual feature 106 of FIG. 1) may be identified in an image, and a bounding box (e.g., bounding box 502 of FIG. 5) may be positioned around the feature (e.g., QR code 500 of FIG. 5) in the image. According to various embodiments, a visual feature may be detected via image processing and machine learning (ML) and/or deep learning (DL) algorithms. ML and DL may utilize artificial neural networks (ANNs) and perform feature detection by analyzing input content, extracting meaningful features (e.g., edges, colors, and/or other distinct patterns), and learning a mathematical mapping function between an input and an output. For example, a mapping function may be developed by feeding images with visual features (e.g., QR codes) in different views and a bounding box around the visual features for the ANN to replicate the effort by creating a bounding box around the visual features in future images.

In an example including QR codes, a QR code may be located randomly in an image and is not known a priori. A QR code may be skewed horizontally and/or vertically depending on the perspective of a camera, and a QR code may be rotated at different angles relative to the rotation of the image and camera. The size of the QR code may also vary due to its distance from the camera. Further, in some examples, a single image may include multiple instances of an object to be detected. Moreover, a combination of these factors may happen simultaneously as they may not be mutually exclusive.

Figure 6:
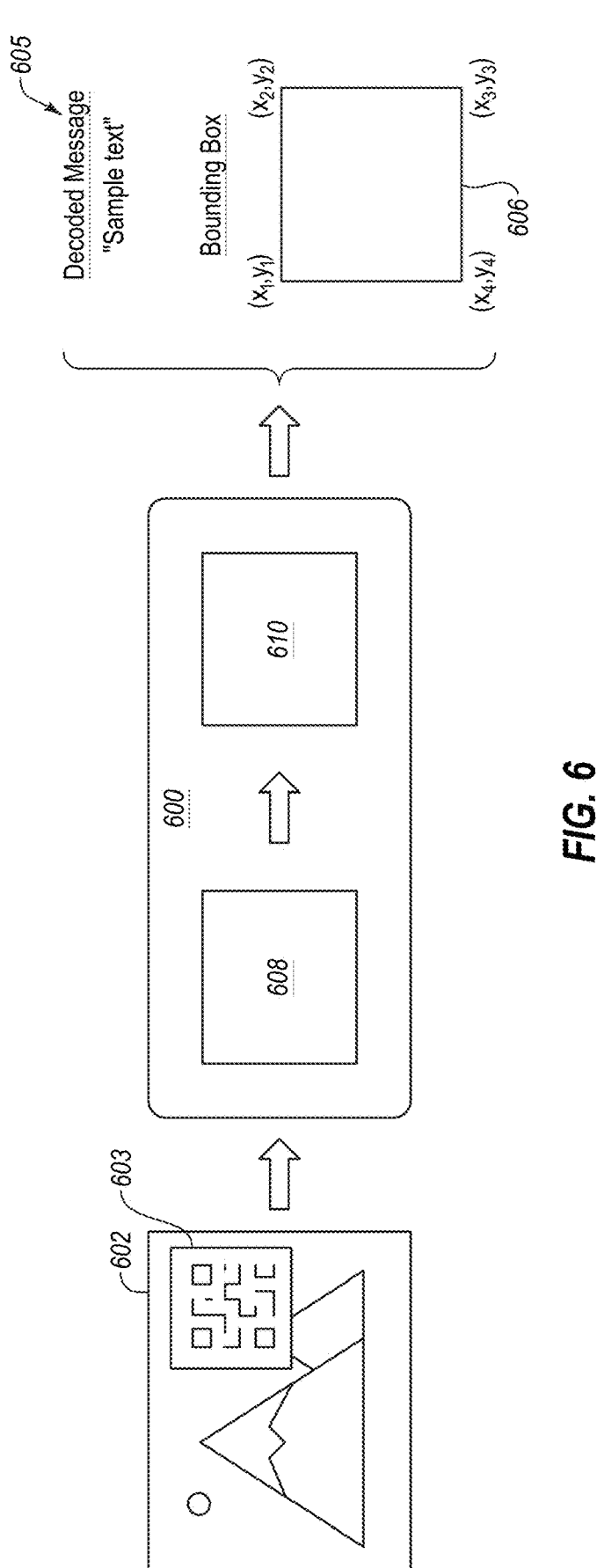
FIG. 6 illustrates an example system, according to various embodiments of the present disclosure.

FIG. 6 depicts an example system 600 configured to identify locations of visual features in imagery, according to various embodiments of the present disclosure. Generally, system 600 may be configured to receive an image including a code and generate a bounding box around a code. More specifically, system 600 may be configured to identify a code in an image (e.g., a video stream of images) and generate a bounding box (a contour) along the edges of the code. For example, system 600 may be configured to process multiple video frames per second, as a vehicle controller (e.g., a drone controller) may be configured for sub-second updates (e.g., for responsive and/or stable flight).

System 600 (also referred to herein as a "computer vision module"), which may include computer vision module 206 of FIG. 2, includes a DL module 608 and a ML module 610. System 600 may be configured to receive image 602 and generate an output, which may include decoded data 605 stored in a detected visual feature 603 of image 602 and a bounding box 606 at least partially around detected visual feature 603. In some embodiments, an output may include more than one feature. Further, in some embodiments, the output may include a subset image with visual feature 603. System 600 may return, for example, "none" if a visual feature was not detected in image 602.

For example, DL module 608 may include a convolutional neural network (CNN) configured for near/real-time object detection. For example, DL module 608 may include a real-time detection system, such as You Only Look Once, version 3 (YOLOv3). Examples of such CNN-based object detection techniques are well known in the art. Non-limiting examples of such CNN-based object detection techniques include those shown in J. Redmon, A. Farhadi, "YOLOv3: An Incremental Improvement," arXiv: 1804.02767, April 2018.

According to some embodiments, DL module 608 may be configured to extract meaningful features from an image (e.g., image 602) and modify a scale of the image and allow for multiscale predictions. DL module 608 may further be configured to detect if an object (e.g., code 603) is present. DL module 608 may have a fixed input size, determined by the number of neurons in a first layer, which may dictate the size of an image that may be processed. Images that do not match the input size of the network may need to be resized to the appropriate dimension.

ML module 610, which may include a computer vision and machine learning module, may include a dedicated module for detecting and decoding codes (e.g., QR codes). ML module 610 may include, for example, an Open Computer Vision (OpenCV) library, which is an open-source library of programming functions for real-time computer vision, as will be appreciated by a person having ordinary skill in the art.

According to some embodiments, DL module 608 may be configured to extract a QR code from an image and provide formatting to improve functionality of ML module 610. More specifically, for example, DL module 608 may remove at least some background "noise" of an image (e.g., image 602) and provide ML module 610 with a cropped image where a code (e.g., code 603) occupies the majority of the space of the image, thus reducing the likelihood of ML module 610 not detecting the code and also increasing the detection and decoding speed of ML module 610.

According to some embodiments, ML module 610 may use an edge detection algorithm across an image to identify a hierarchy of points that forms a feature (e.g., code) signature. A detect operation of ML module 610 may perform the localization of the code (e.g., code 603), and in response to vertices of the code being returned, a decode operation may be performed to decode a message encoded in the code, and a string containing the message (e.g., "Sample text" of FIG. 6) may be generated. According to some embodiments, system 600, including DL module 608, may be trained to detect codes (e.g., QR codes) via neural network training methods, as will be appreciated by a person having ordinary skill in the art. For example, DL module 608 and/or ML module 610 may be via a training set that is generated to represent a feature (e.g., a code) in various view and distortions (e.g., by capturing pictures of the feature and/or virtually generating images of the feature in a simulated environment).

Figure 7:
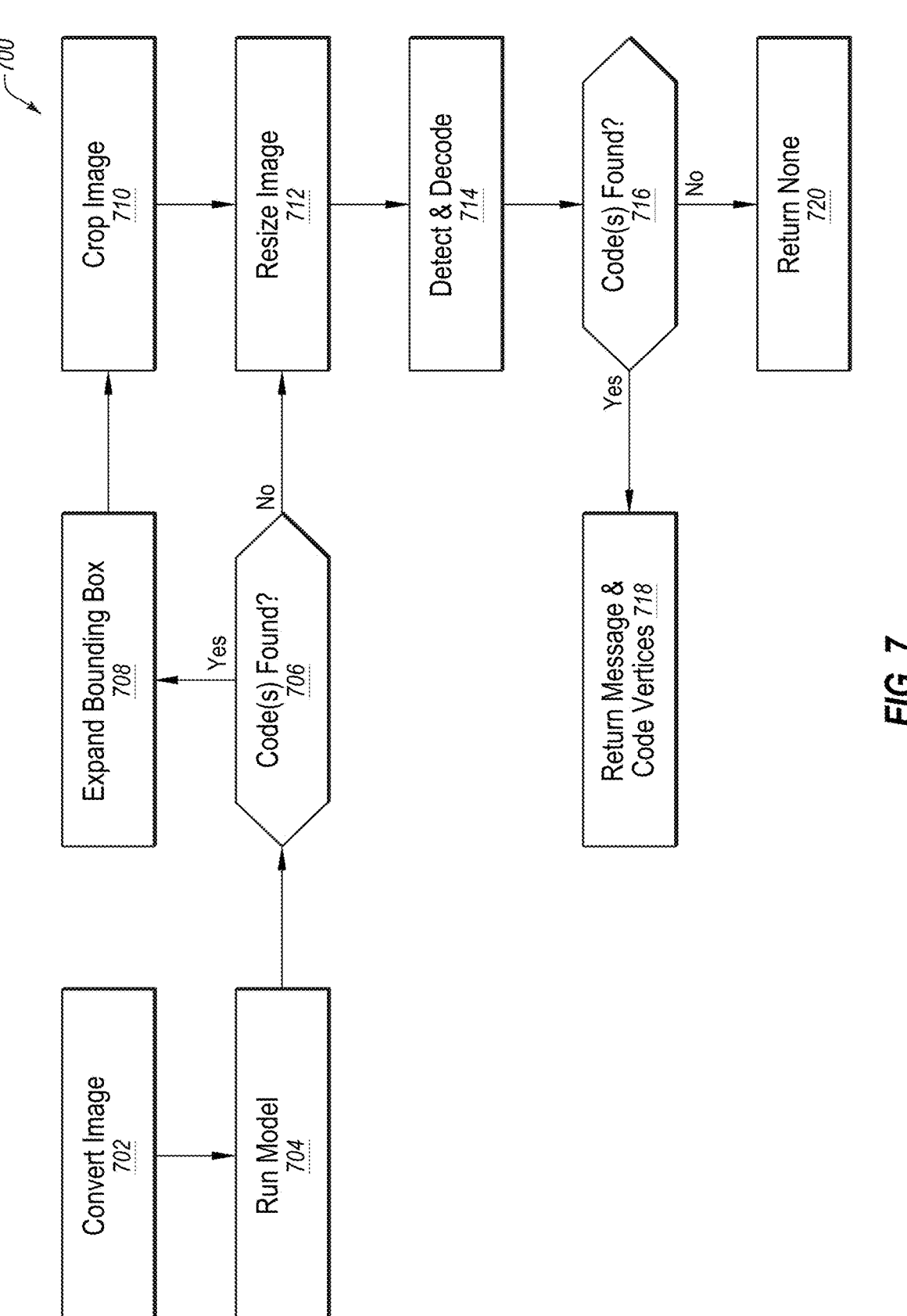
FIG. 7 is a flowchart of an example method of detecting codes, in accordance with various embodiments of the present disclosure.

FIG. 7 is a flowchart of an example method 700 of detecting codes in an image, in accordance with various embodiments of the present disclosure. Method 700 may be arranged in accordance with at least one embodiment described in the present disclosure. Method 700 may be performed, in some embodiments, by a device or system, such as system 200 of FIG. 2, control loop 400 of FIG. 4, system 600 of FIG. 6, system 1700 of FIG. 17, or another device or system. Although illustrated as discrete blocks, various blocks may be divided into additional blocks, combined into fewer blocks, or eliminated, depending on the desired implementation.

At block 702, an input image object (e.g., from a video stream) may be converted into another ("converted") image object, and method may proceed to block 704. For example, an OpenCV image object (which may include accessible native camera data) may be converted into, for example only, a Python Imaging Library (PIL) image object (e.g., to be used by module DL 608 of FIG. 6).

At block 704, a model (e.g., of DL module 608 of FIG. 6) may be run on the converted image object (i.e., to detect one or more codes (e.g., QR codes)), and method 700 may proceed to block 706. At block 706, it may be determined whether one or more codes are detected. If the model was able to detect a code, a bounding box may be generated (e.g., at least partially around the detected code), and method 700 may proceed from block 706 to block 708, where a bounding box region is expanded (e.g., to improve detectability). For example, a bounding box region may be expanded (e.g., by a percentage p, such as between 5% and 20%) to ensure edges of the code do not fall outside an original bounding box region. For example, a bounding box may be fit to an actual border of the code (e.g., via image processing).

A scaled image including the expanded bounding box may be cropped at block 710 and/or resized at block 712, if necessary. For example, the image may be cropped and/or resized if dimensions of the image exceed a maximum size established for good performance (i.e., for detecting QR codes) in ML module 610 of FIG. 6. For example, if either the width or height of the image exceeds, for example, 1,080 pixels, the image may be scaled down to, for example, 1,080 pixels in the respective dimension and the remaining dimensions may be scaled by the appropriate factor to maintain the original aspect ratio. Moreover, the image may be cropped to eliminate a surrounding environment (e.g., to provide an image focused on one or more codes). Further, the scaled image may be provided to block 714, wherein a detect and decode operation (e.g., of ML module 610 of FIG. 6) may be performed.

If the model was not able to detect a QR code at block 704, method 700 may proceed from block 706 to block 712, where the original input image object may be resized (i.e., if necessary) and a detect and decode operation (e.g., of ML module 610 of FIG. 6) may be performed at block 714.

At block 716, it may be determined whether one or more codes are detected (e.g., via one or more known methods (e.g., OpenCv)). If a code was detected at block 714, method 700 may proceed from block 716 to block 718, where a bounding box (i.e., at least partially around a detected code) and possibly a decoded message is provided (e.g., by system 600 of FIG. 6). If a code was not detected at block 714, method 700 may proceed from block 716 to block 720, where a system (e.g., system 600) may return, for example, "none." It is noted that method 700 may be repeated for each image and/or for a subset of images.

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, an image may include more than one code that that may be used to make a decision regarding location. A single code may provide sufficient accuracy, and more than one code may improve accuracy of location identification. Further, according to various embodiment, one or more images may be filtered (e.g., for improving detectability).

As noted above, a visual feature (e.g., visual feature 106; see FIG. 1) may be analyzed to determine a location of a vehicle (e.g., vehicle 104 of FIG. 1) with respect to the visual feature.

Figure 8A:
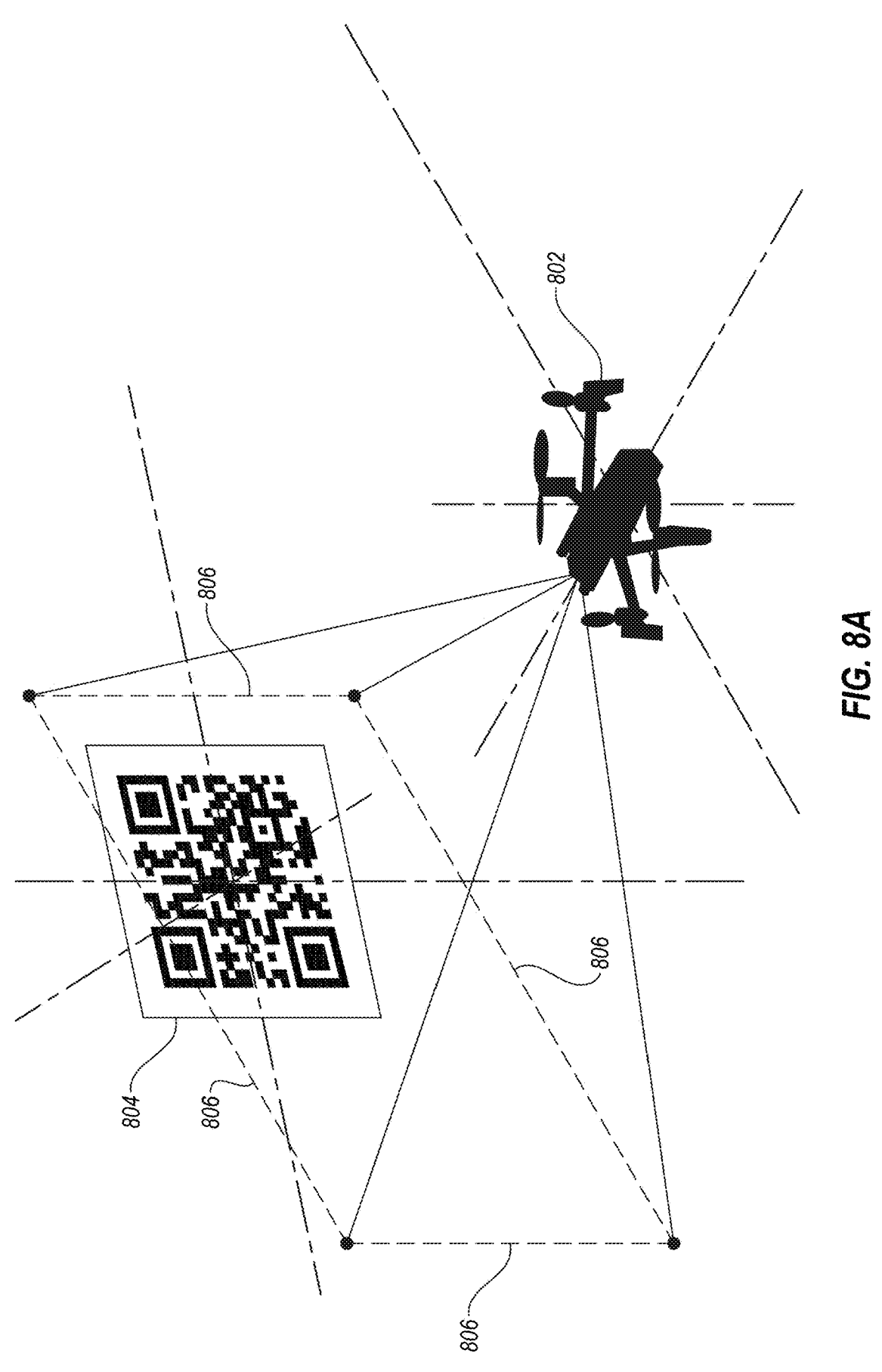
FIGS. 8A-8D each depict a code, a vehicle, and one or more planes, which may be used in accordance with various embodiments of the present disclosure.
Figure 8B:
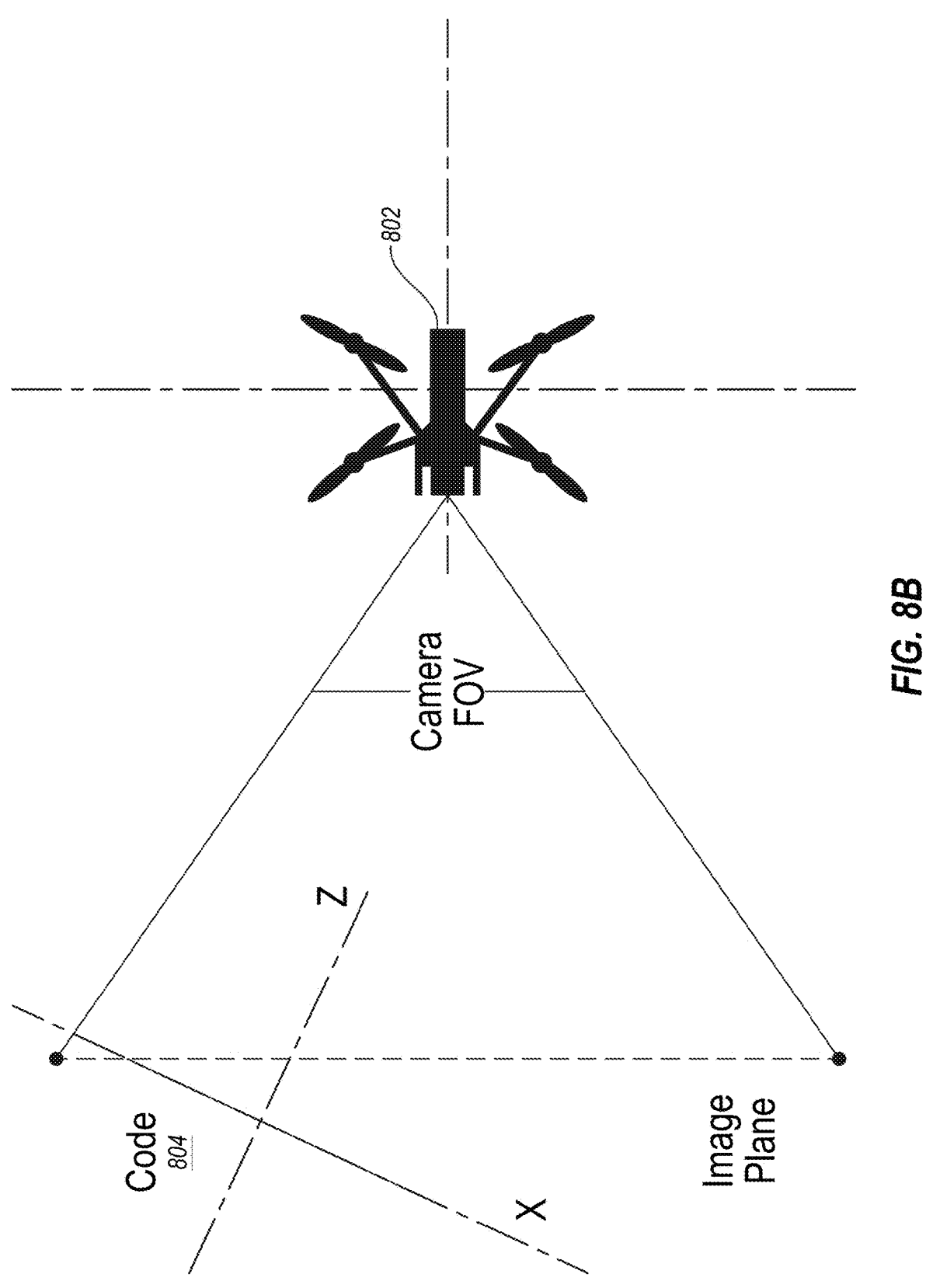

FIGS. 8A-8D each depict a vehicle 802, a QR code 804, and one or more planes. With reference to FIG. 8A, a view (e.g., a view from vehicle 802) of QR code 804 can be visualized by rectangle 806, which represents an image plane viewed by vehicle 802 (i.e., a camera of vehicle 802). Image plane 806 is defined as the plane parallel to a camera sensor (i.e., of vehicle 802) and onto which a representation of everything within the camera's FOV is projected. The representation of QR code 804 on image plane 806 may be distorted unless all edges are of equal distance to the point of reference inside the camera. Therefore, by measuring the distortion, the yaw and relative distance between QR code 804 and vehicle 802 may be calculated, and the axes of QR code 804 may be used as the coordinate system by which to determine a location of vehicle 802.

As discussed above, a bounding box or contour along the edges of QR code 804 may be extracted from a number of frames (e.g., each frame or every few frames) streamed back from a camera in real-time. Given that the camera on vehicle 802 has a fixed FOV, the scale and transformation of the contour's edges may be used to determine a number of view angles (e.g., including the yaw angle of vehicle 802 relative to a face of QR code 804) and a relative position of vehicle 802 in a Cartesian coordinate system.

Figure 8C:
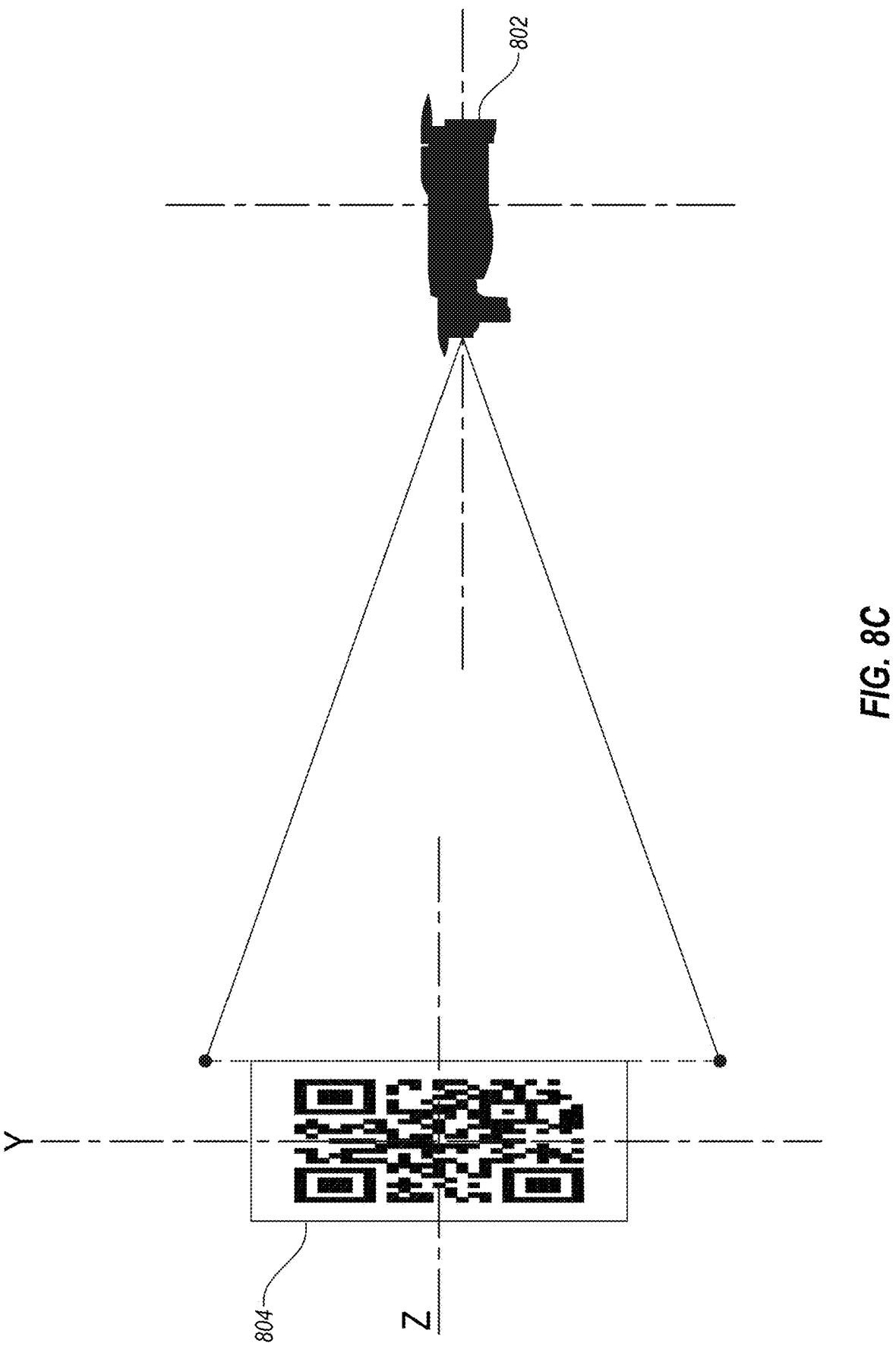

For discussion and practical purposes, QR code 804 is assumed to possess any yaw rotation including zero. Pitch and roll of QR code 804 are fixed at zero as QR code 804 may be level and positioned on a vertical wall, and a self-stabilizing (e.g., gimbal mounted) camera may assure that the camera is pointing straight ahead along the X axis of vehicle 802 and perpendicular to gravity. These assumptions and controlled variables allow for the projection on the YZ plane to appear, as shown in FIG. 8C.

Figure 8D:
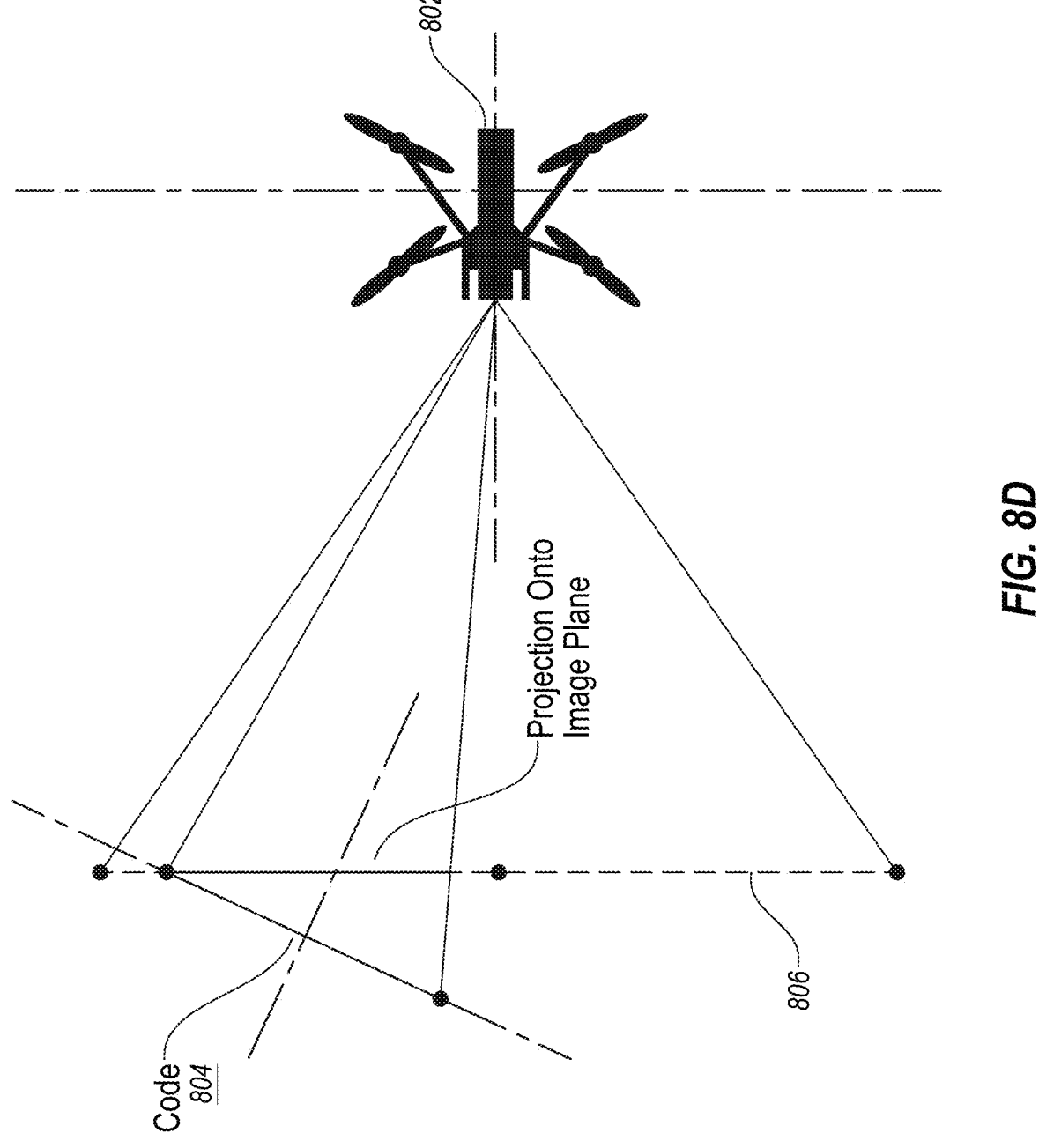

If the axis normal to the surface of QR code 804 and the axis normal to image plane 806 are both projected onto the YZ plane, the axis normal to the surface of QR code 804 and the axis normal to image plane 806 will be parallel. In other words, image plane 806 and the plane of QR code 804 may be parallel when projected onto the YZ plane as shown in FIGS. 8C and 8D. This may simplify the requirements to deduce the location of vehicle 802 and is also a realistic solution when placing QR codes for vehicle navigation in the real world. It is noted that in these embodiments, the pitch of the QR code and camera are both zero, which is expected due to the QR code being mounted on a vertical wall and the gimbal on the vehicle maintaining the camera level. However, embodiments wherein the pitch of the QR code and/or the camera are non-zero values is also within the scope of the present disclosure.

With the assumption that pitch and roll of QR code 804 are always zero, yaw may be determined by comparing the horizontal and vertical edge lengths of the contour bounded around the projection of QR code 804 onto the camera plane. FIG. 8D shows the projection of QR code 804 onto image plane 806 can be represented by drawing line segments from the camera to the edges of QR code 804 and then drawing a line segment between where those segments intersect image plane 806.

Figure 9:
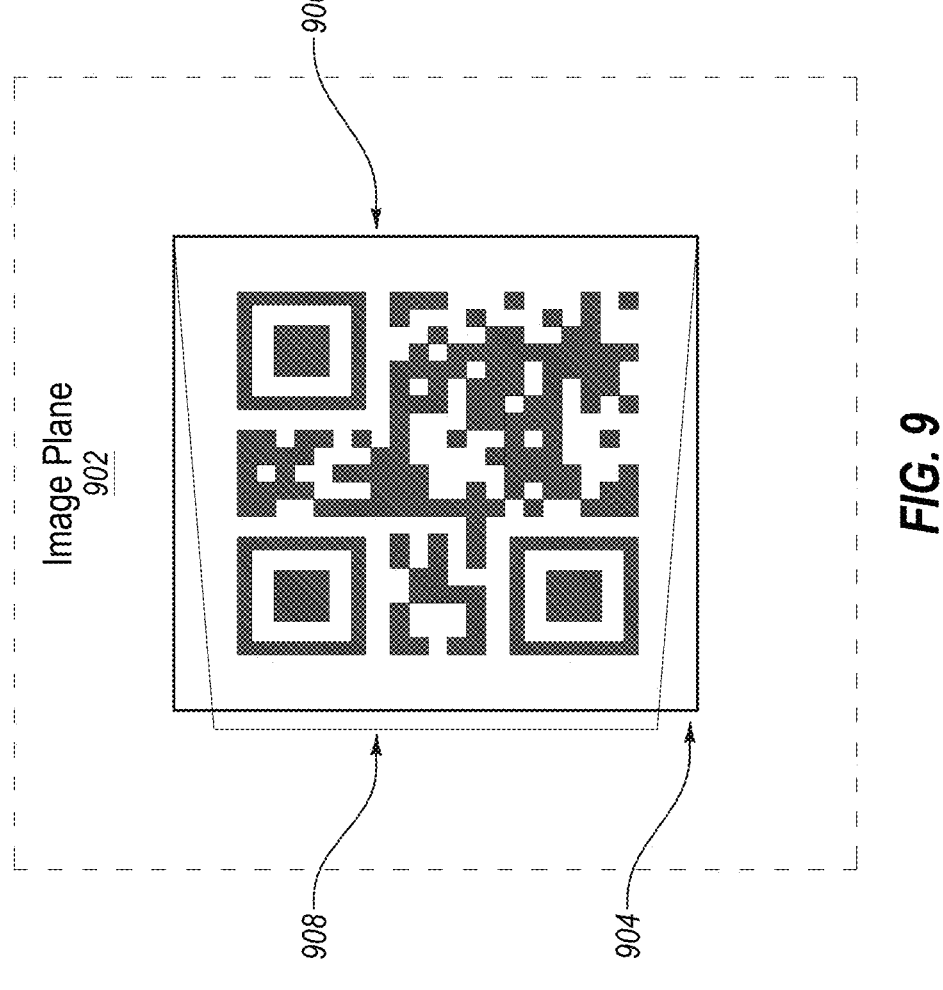
FIG. 9 depicts an image plane and a code, according to various embodiments of the present disclosure.

FIG. 9 depicts a view parallel to an image plane 902 with an undistorted view 904 of a QR code at a 25-degree yaw angle and a representation of a projection onto image plane 902 illustrated by a contour 908.

For example, coordinates (in pixels) of the corners of the QR code may be extracted from the image (e.g., via system 600 of FIG. 6) and used to determine an edge length of each side of the projection depicted by contour 908. By knowing that the pitch is zero, it may be assumed that distortion along the vertical axis is only due to distance. Therefore, the closest vertical edge 906 may have the greatest length and serve as the reference for the true size of the QR code at some unknown distance. The greatest length may be measured in pixels that may be converted to degrees based on the known FOV and known resolution of each frame (i.e., degrees per pixel=horizontal field of view/resolution of image width).

By measuring the height of the projected contour on both sides, the closest edge to the point of reference may be determined as it will have the greatest length (i.e., the smaller the edge the further the distance). The closest edge to the point of reference may then be used as a ratio for the true width of the QR code in pixels as there should be no pitch or roll to distort the projection.

FIGS. 10A-10E depict various example geometries, which may be used to determine a location of a vehicle. It is noted that the embodiments described with reference to FIGS. 10A-10E are provided as example embodiments to determine a location of vehicle, and other embodiments may be used to determine a location of a vehicle.

With reference to FIG. 10A, a geometry 1000 of angles defining QR code yaw is depicted. Angles shown in FIG. 10 are represented by a value of 90 degrees minus half the horizontal FOV (FOV$_H$). Assuming no lens distortion, angle A, between the image plane and the intersecting line drawn from a point of reference (POR) 1002 to the vertical edge of the QR code, may be determined via the following equation:

$$\angle A = 180° - \left(90° - \frac{FOV_H}{2}\right) - FOV_{QRi}; \tag{1}$$

wherein FOV$_{QRi}$ is the angle between the camera FOV edge and the edge of the QR code that is closest to the center of the camera FOV. Angle FOV$_{QRi}$ may be determined by converting pixels to degrees as described above. The Law of Sines may then be used to derive the yaw from the three known variables: angle A, a width of the projected QR code in pixels, and a representative true width in pixels of the QR code using the vertical edge pixel width.

FIG. 10B depicts a more detailed view of H depicted in FIG. 10A. The width of the QR code measured in pixels is represented by variable LQR, while LQRP is the projected width of the QR code in pixels, and angle A is determined by the relationships described above. Applying of the Law of Sines yields:

$$\frac{L_{QR}}{\sin(A)} = \frac{L_{QRP}}{\sin(B)}; \tag{2}$$

$$\angle B = \sin^{-1}\left(\frac{L_{QRP}}{L_{QR}}\sin(A)\right); \tag{3}$$

$$\angle C = |yaw| = 180° - \angle A - \angle B \tag{4}$$

The sign of angle A may be determined by which side of center the QR code falls on and which vertical edge is nearest to the point of reference. Due to the numerous possible orientations of the QR code with respect to the camera's FOV, deriving the yaw value is not always straightforward as the Law of Sines allows for as many as two solutions. As will be appreciated, there are multiple rules for determining the true yaw angle given any orientation of the QR code within the camera's FOV.

The sign of the yaw angle can be broken down into rules by where the axis normal to the QR code's surface and passing through its center intersects the axis normal to a vehicle's image plane and passing through the center of the camera. If the QR code is located in the second or third quadrant (left half) of the image plane and the two planes intersect in front of the QR code with respect to the vehicle, or if the QR code is in the first and fourth quadrants of the image plane (right side) and the planes intersect behind the QR code, the yaw may be considered negative. If the QR code is located in the first and fourth quadrants and the planes intersect in front of the QR code, the yaw may be considered positive. Likewise, if the QR code is located in the second or third quadrants of the image, the planes may intersect behind the QR code for the yaw to be positive. The sign may be maintained for accurate calculations of relative distances.

Figures 10C, 10D:
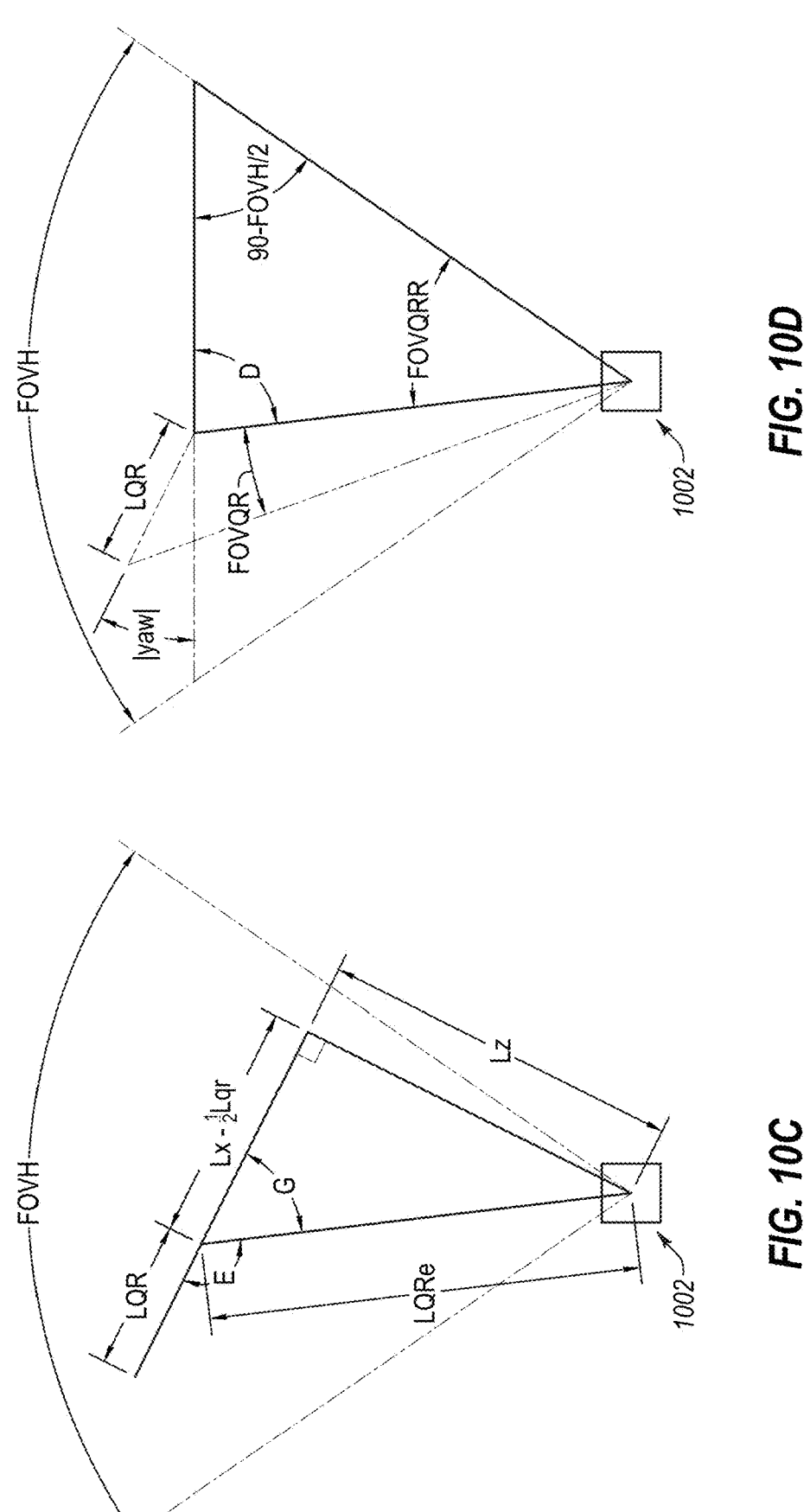

Once the yaw is obtained, the distance (Lz) (see FIG. 10C) from POR 1002 to the QR code along the axis normal to the QR code's surface may be derived as well as the horizontal distance (Lx) from the center of the QR code along the axis parallel to the QR code's surface, as shown in FIG. 10C.

By converting pixel width to degrees as described above, several angles can be extracted from an image and used to solve the triangles needed to determine the relative distance of the vehicle from the QR code. By measuring the number of pixels between the right most edge of the camera FOV and the right most edge of the QR code, the number of pixels may be used to find the angle FOVQRR between the right edge of the camera FOV and the right most edge of the QR code (see FIG. 10D). This is different than FOVQRi defined above because this is always to the right edge of the QR code regardless if that is the inner or the outer edge. Angle D in FIG. 10D can be derived by the following equation:

$$\angle D = 180° - \left(90° - \frac{FOV_H}{2}\right) - FOV_{QRR} = 90° + \frac{FOV_H}{2} - FOV_{QRR} \quad (5)$$

Figure 10E:
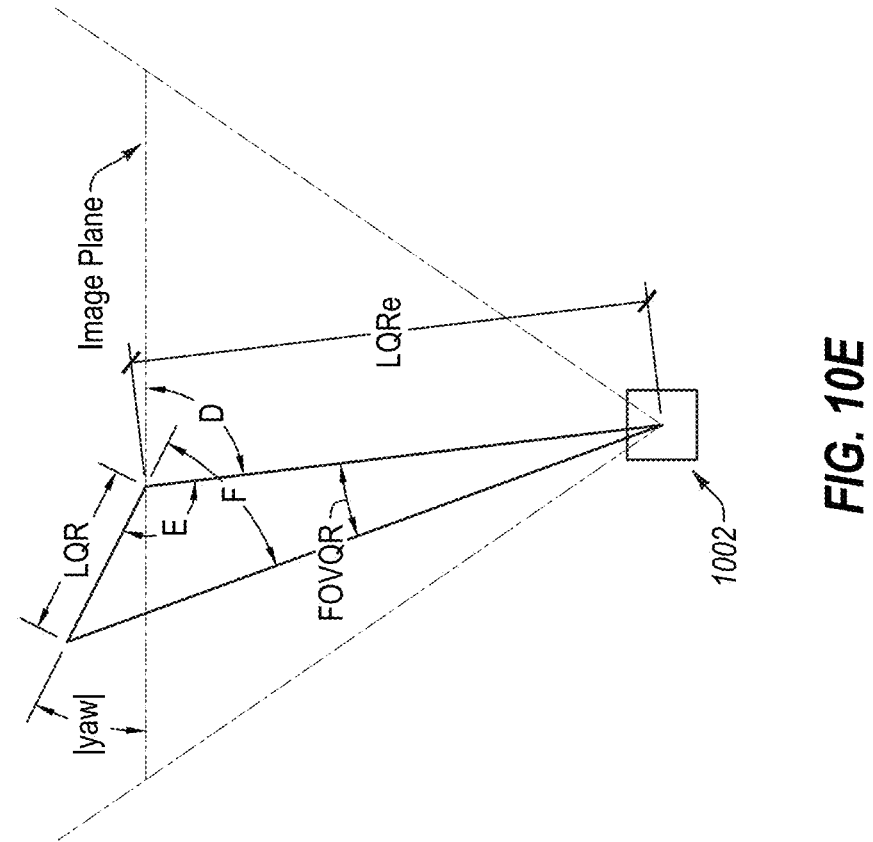

Next, a triangle can be drawn using the three vertices defined by the horizontal edges of the QR code and one at POR 1002 of the camera, as shown in FIG. 10E. Angle E may then be determined as the sum of the complementary angle of angle D and the yaw angle. The last unknown angle (Angle F) may then be determined.

$$\angle E = 180° - \angle D + \text{Yaw} \quad (6)$$

$$\angle F = 180° - \angle E - FOV_{QR} \quad (7)$$

Further, the Law of Sines may be applied to derive length LQRe as the QR code width LQR is known.

$$L_{QRe} = \frac{\sin(F)LQR}{\sin(FOVQR)} \quad (8)$$

Measurements of interest are represented by side lengths LQRe, LZ, and LX−(½)LQR in FIG. 10C, showing the right triangle of interest. To solve the triangle completely, angle G may be calculated, which is merely the complementary angle of angle E.

$$\angle G = 180° - \angle E \quad (9)$$

Legs of the triangle may then be solved according to known methods. Because the width of the QR code is known, it may be possible to add one half the width (½LQR) to the horizontal leg to determine distance Lx.

$$Lx - \frac{L_{QR}}{2} = L_{QRe}c(G); \quad (10)$$

$$Lx = \frac{L_{QR}}{2} + L_{QRe}c(G); \quad (11)$$

$$Lz = L_{QRe}s(G) \quad (12)$$

A right-triangle is drawn to the right most edge of the QR code, therefore when the vehicle is to the left of the QR code, a negative value is returned from $L_{QRe}$ cos(G) and one half the QR code width is added, effectively subtracting one half the QR code width from the absolute value of the horizontal distance. In the opposite scenario, when the vehicle is to the right of the QR code, one half the QR code width is added to the absolute value of the horizontal distance. If the yaw angle is correct in magnitude but not in sign, the results of the horizontal calculations may be off by at least one half the QR code width and will also have the incorrect sign.

As noted above, the location of vehicle 104 may be used in a control loop to maneuver vehicle 104 to the next location (e.g., proximate the next visual feature) along a route (e.g., route 105 of FIG. 1). To effectively create a controller for a vehicle, a linearized or non-linearized model of the vehicle's position as a function of a Euler angle (roll, pitch, yaw) may be used. In some embodiments, a vehicle command allows for Euler angles (roll, pitch, and yaw) to be passed as arguments to the vehicle, as well as throttle to control the vehicle's altitude. The characterization of the model may be dependent on the control inputs that the vehicle supports. A model for the roll and pitch axis response of the vehicle may be approximated using the vehicle's internal inertial measurement unit and API reporting messages of the vehicle. The model may be used as the basis for the vehicle's axis tilt stabilization controllers.

According to various embodiments, system identification may be used to determine a model for the vehicle's response. Further, as will be appreciated, a model may be determined via preforming test runs on a vehicle and noting how the vehicle responds and/or a model may be developed, as described below.

The model represents the change in axis tilt of the vehicle based on a vehicle command input and may be effective at modeling the behavior of the vehicle's axis tilt response for pitch and roll. Roll and pitch angles are determinant of the horizontal movements of the vehicle and may result in the changes in acceleration and velocity. Therefore, a mathematical model of the vehicle's acceleration and velocity as a function of axis tilt may be used to estimate its horizontal position. To calculate the horizontal displacement of the vehicle as a function of pitch and roll, the velocity and acceleration of the vehicle may be calculated. Acceleration of the vehicle on each axis can be modeled by the following equation:

$$\text{Acceleration} = \frac{\text{thrust} - \text{drag}}{\text{mass}}; \quad (13)$$

wherein "thrust" is the force along the reference axis, "mass" is the mass of the vehicle, and "drag" is the impedance to movement based on the geometry and velocity of the vehicle (e.g., through air). Equation (14) below is an effective drag equation used for general body drag of a quadcopter assuming the quadcopter is treated as the rectangular volume that encloses all of the components of the vehicle except for the rotors:

$$F_{d;body} = \frac{1}{2}rv_a^2 C_D A; \quad (14)$$

wherein r is the density of the air, $v_a$ is the wind velocity, $C_D$ is the drag coefficient, and A is the projected surface area of the quadcopter calculated by computing the projection of the quadcopter volume onto the 2D plane orthogonal to the direction of va.

To calculate the surface area for the calculations above, a 3D model of the vehicle may be used and rough bounding rectangles may be drawn to calculate the surface area normal to each of the X and Y axes. The projected surface area normal to the direction of movement may then be calculated as:

$$Ax = A_{top}\sin\theta + A_{front}\cos\theta; \quad (15)$$

$$Ay = A_{top}\sin\phi + A_{side}\cos\phi \quad (16)$$

When the vehicle is hovering at a constant altitude, it can be concluded that the thrust along the Z axis (upward) is equal to the acceleration due to gravity times the mass of the vehicle. Thus, assuming the vehicle maintains a constant altitude, the thrust along the horizontal axis may be calculated.

Assuming that each axis is largely uncoupled, the equation for thrust directed in the X and Y axis as a result of pitch and roll can be calculated as tangent of the pitch/roll and angle multiplied by the vehicle's mass multiplied by acceleration from gravity. Thus, the full equations of acceleration of the vehicle in the X and Y axis are:

$$a_x = \frac{mg\tan\theta - \frac{1}{2}rv_x^2 C_D A_X}{m}, vx = \int_0^\tau a_x dt, p_x = \int_0^\tau v_x dt; \quad (17)$$

$$a_y = \frac{mg\tan\phi - \frac{1}{2}rv_y^2 C_D A_y}{m}, vx = \int_0^\tau a_x dt, p_x = \int_0^\tau v_x dt \quad (18)$$

From the acceleration, relative velocity and position of the vehicle may be calculated via integration, as shown above. The behavior of the vehicle along each axis is relatively uncoupled, allowing for each axis to be modeled independently of the rest. For the purposes of a simplified model, the movement assumed along one axis does not affect the movement of the vehicle along any other axis. While this is not always true, the interference is negligible for the constraints of a modeling application.

Figure 11:
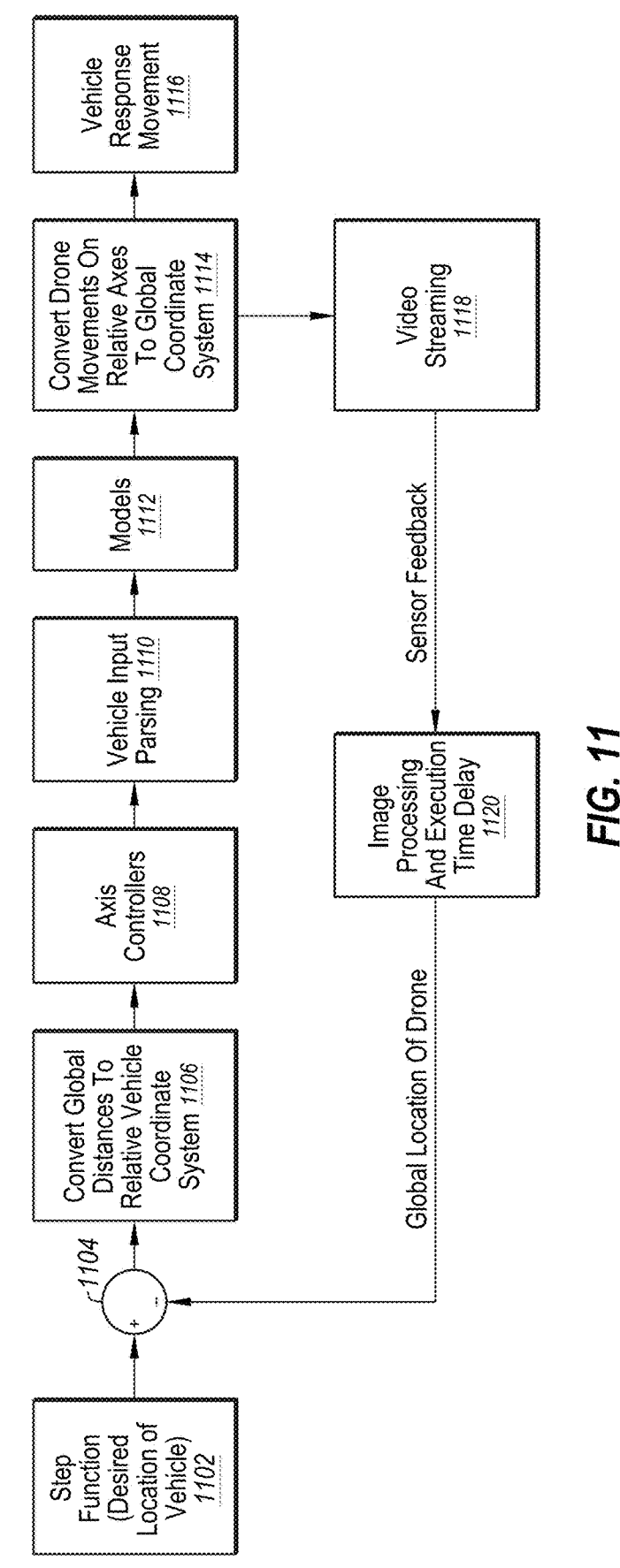
FIG. 11 depicts an example model for vehicle control, according to various embodiments of the present disclosure.

Once the mathematical model is achieved, each axis of a vehicle may be modeled along with a mathematical representation of a vehicle command. FIG. 11 depicts an example model for vehicle control, according to various embodiments of the present disclosure. More specifically, FIG. 11 depicts an example model 1100 of axes of a vehicle (e.g., vehicle 104 of FIG. 1).

As shown in FIG. 11, a desired location 1102 of a vehicle is provided to a comparison node 1104 of model 1100. Comparison node 1104 also receives a global location of the vehicle and generates a location error, which is received at a conversion block 1106 of model 1100.

It is noted that the reference angles used in a vehicle command are respect to the vehicle itself, meaning that responses may be calculated (i.e., via axis controllers 1104 of model 1100) based on the relative axes of the vehicle, not the global coordinate system based on the code. Therefore, to compute the movement of the vehicle on the global coordinate plane, a rotation matrix may be applied to the relative x and y displacements of the vehicle before computing the feedback error for axis controllers 1104. By using the simple two-axis rotation matrix below in equation (19), the movements of the vehicle along its relative axes can be translated to the global coordinate system. Yaw and altitude correspond correctly to the global coordinate system and thus may not require any transformation.

At block 1106 of model 1100, a location error in global coordinates is converted to relative coordinates (e.g., because axis 1108 controllers may use relative coordinates for correct control). This conversion uses the rotation matrix in the following equations.

$$R = \begin{bmatrix} \cos\psi & -\sin\psi \\ \sin\psi & \cos\psi \end{bmatrix} \quad (19)$$

Further, in a conversion block 1114, a conversion from relative coordinates to global coordinates is performed. In some applications, only the conversion from global to relative may be necessary as the sensor feedback may inherently report in global coordinates.

$$[X_{global} Y_{global}] = \begin{bmatrix} X_{relative} \\ Y_{relative} \end{bmatrix} R \quad (20)$$

$$[X_{relative} Y_{relative}] = \begin{bmatrix} X_{global} \\ Y_{global} \end{bmatrix} R \quad (21)$$

At block 1110, inputs received at the vehicle may be parsed and received at models 1112. In some embodiments, input commands (i.e., received at a vehicle) may be integers (e.g., on an interval from −100 to 100). Further, values conveyed to the vehicle may be a percentage of a maximum value (e.g., a maximum value stored in the drone's firmware). For pitch and roll, values may include a percentage of maximum tilt angle. "Yaw" may refer to the percentage of maximum angular rate, and "throttle" may refer to the percentage of maximum velocity with positive values accelerating the vehicle upward, negative values accelerating the drone downward, and a zero value maintains the altitude of the vehicle. To prevent commands being rejected, any output from a controller and/or a processor that serves as an input into vehicle command may be clipped and rounded to integer format, which may cause significant nonlinearization of the overall model.

A throttle value in vehicle command (sometimes referred to as Gaz) represents a vertical velocity in meters per second, therefore, to calculate position, only a single integration may be needed. "Yaw" represents an angular rate in radians per second. According to some embodiments, yaw and throttle responses may be controlled using only a proportional coefficient of a proportional-integral-derivative (PID) controller.

Model 1100 further includes a vehicle response movement block 1116 (i.e., representing movement of the vehicle in response to one or more commands), a video streaming block 1118 for capturing images and identifying codes, and image processing block 1120 to determine a location of the vehicle based on one or more identified codes.

As noted above, a second, different implementation of unmanned vehicle navigation will be described with reference to FIGS. 1-5 and 12A-17. Similar to various embodiments described above, in the second implementation, various embodiments include identifying and using codes (e.g., QR Codes) for location identification and navigation of vehicles. For example, in these embodiments, one or more codes of a single input image (i.e., as captured by a vehicle) may be identified and separated into multiple subimages, wherein each subimage includes a region that includes a code.

Figure 12A:
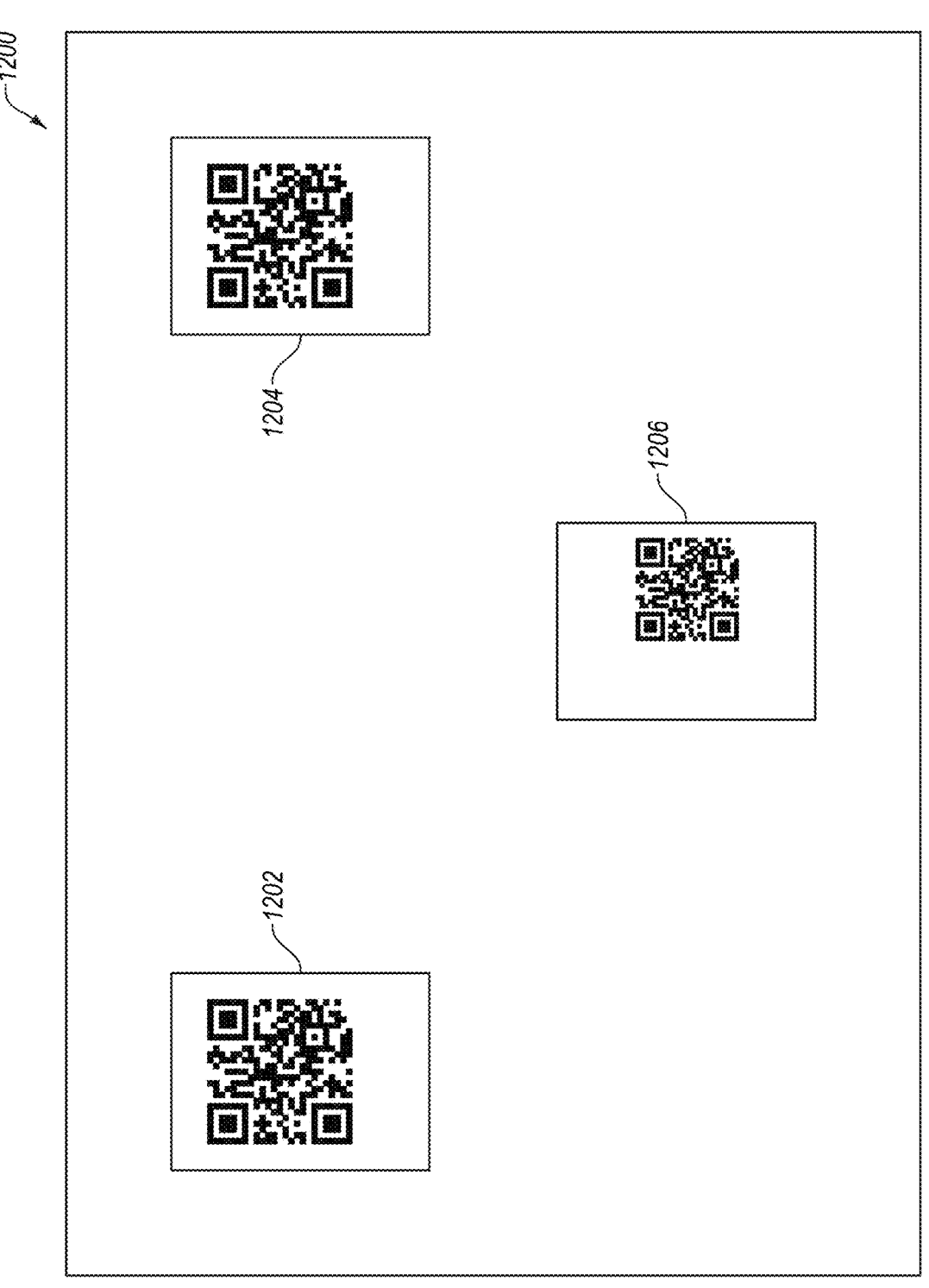
FIG. 12A illustrates an example image including a number of codes, in accordance with various embodiments of the present disclosure.

For example, FIG. 12A illustrates an image 1200 including a number of QR codes 1202, 1204, and 1206. To process image 1200, a binary threshold may be applied to pixels of image 1200 to set all low lightness pixels to a specific value (e.g., 0 (black)) while the remainder of the pixels remain at their original value. Further, image 1200 may be processed via a series of filters at different kernel sizes (e.g., for different threshold and kernel indices) to generate a number of output results (e.g., twelve output results for combinations of threshold indices ranging from 1 to 4 and a kernel indices ranging from 1 to 3). FIG. 12B illustrates an example output result wherein a threshold index=1 and kernel index=1, and FIG. 12C illustrates another example output result wherein a threshold index=4 and kernel index=3. As will be appreciated, a code 1212 of FIG. 12B and a code 1222 of FIG. 12C correspond to code 1202 of FIG. 12A, a code 1214 of FIG. 12B and a code 1224 of FIG. 12C correspond to code 1204 of FIG. 12A, and a code 1216 of FIG. 12B and a code 1226 of FIG. 12C correspond to code 1206 of FIG. 12A.

Further, a shape detection process may be performed on each output result (e.g., a contours of each output result may analyzed) to detect and identify potential regions of interest (ROI) at least partially around each depicted code, as shown in FIGS. 12D and 12E. As will be appreciated a code 1232 of FIG. 12D and a code 1242 of FIG. 12E correspond to code 1202 of FIG. 12A, a code 1234 of FIG. 12D and a code 1244 of FIG. 12E correspond to code 1204 of FIG. 12A, and a code 1236 of FIG. 12E and a code 1246 of FIG. 12E correspond to code 1206 of FIG. 12A.

In some embodiments, once a region is processed, pixels of the region may be designated as forbidden and may not be processed again (i.e., to avoid multiple detections).

Figures 12F, 12G, 12H:
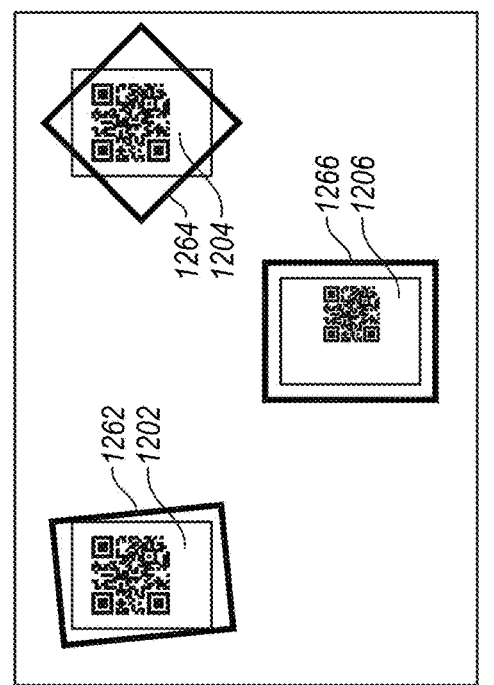
FIG. 12F depicts an example heatmap result, in accordance with various embodiments of the present disclosure.
FIG. 12G illustrates an example mask, according to various embodiments of the present disclosure.
FIG. 12H depicts a number of codes including bounding boxes, according to various embodiments of the present disclosure.

The potential ROIs for each result may be are added cumulatively to generate a ROI heatmap result 1250 shown in FIG. 12F. Further, a threshold may be applied to heatmap result 1250 such that potential code areas (i.e., areas determined to include codes) may be set to a value (e.g., 1 (white)), and all other pixels may be set to another value (e.g., 0 (black)) to generate a mask 1260, as shown in FIG. 12G. Moreover, a detection process, as will be appreciated by a person having ordinary skill, may be applied to image 1200 to generate bounding boxes 1262, 1264, and 1266, as shown in FIG. 12H.

In some embodiments, regions determined to include codes may have corner points, and possibly a bounding box, (i.e., assigned based on width and height) that determine a region of pixels that make up a subimage containing only an associated ROI. To ensure full detection of the codes and to mitigate the potentially erosive effects of thresholding, bounding boxes may be enlarged by a factor (e.g., of 1.1) in each direction.

After detecting a location of a code, a position and rotation of a camera (i.e., of a vehicle) relative to the location of the code may be determined. More specifically, for each detected code, pixel locations of corners of the code may be identified, data of the code may be accessed, and a rectified image of the code may be generated. The pixel locations, code data, and the rectified image may be used to determine a position and yaw rotation of the vehicle relative to the code. It is noted that the roll and pitch may not be captured (i.e., because the vehicle's camera may be automatically leveled). A control system of the vehicle may then translate and perform yaw rotations to move to a desired position and orientation relative to the code.

Figure 13:
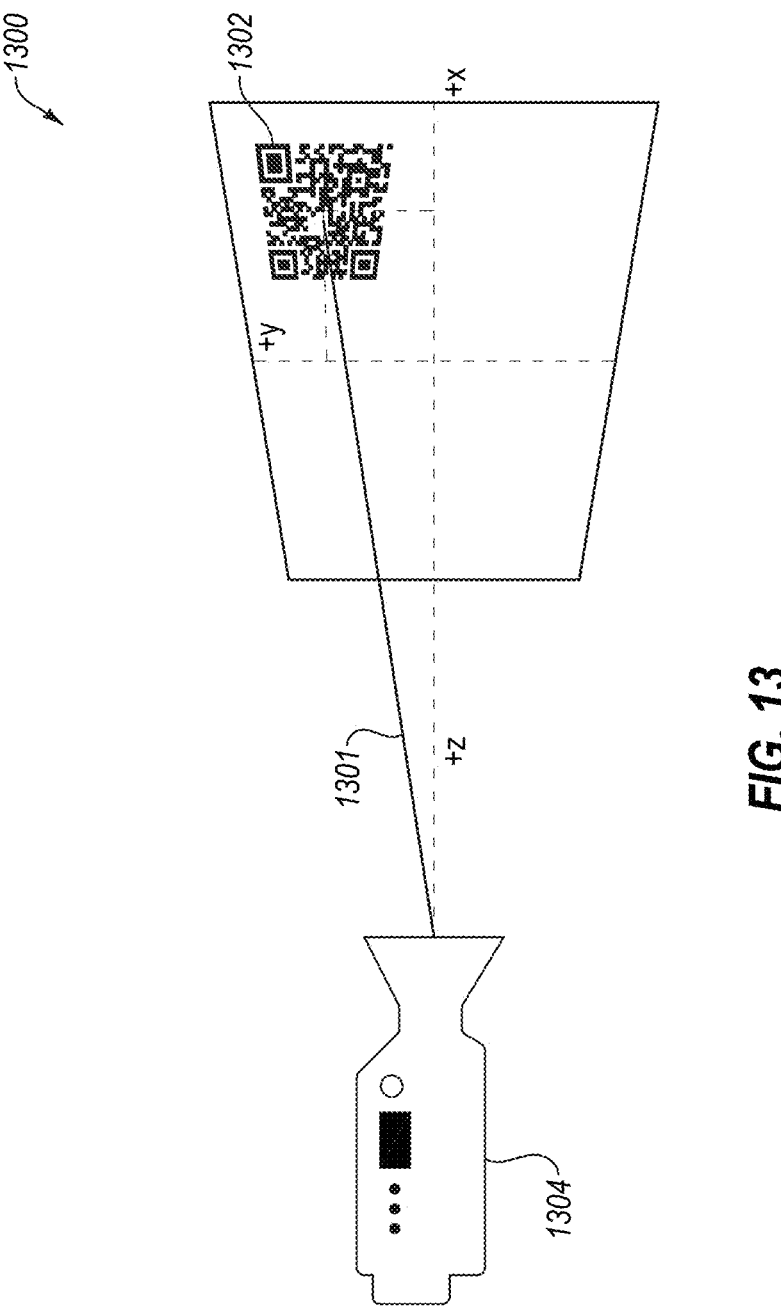
FIG. 13 illustrates an example field of view of a camera, in accordance with various embodiments of the present disclosure.

When a code is identified, pixel locations of the corners of the code may be ordered (e.g., as top-left, top-right, bottom-right, and bottom-left). A homography matrix may then be generated to define a coordinate system relative to the code. From the homography matrix, the scale of the code may be determined and used to determine the size of the code relative to a field of view 1300 as shown in FIG. 13. A size of a code 1302 relative to field of view 1300 may be used to determine a distance from code 1302 (i.e., because the size of the physical dimensions of code 1302 is known). Further, via combination of the distance and the location of the center of code 1302 in the image, a vector 1301 in a polar coordinate system may be determined, as shown in FIG. 13. Vector 1301 denotes the location of code 1302 relative to a camera 1304 of a vehicle.

Vector 1301 may be determined from a position of code 1302 relative to field of view 1300 and the size of code 1302 in field of view 1300. A length of vector 1301 may be determined (i.e., because the size of the code is known a priori). The translation (displacement of camera 1304 relative to the origin of code 1302) may be determined from the polar coordinates of vector 1301. Further, the polar coordinates may be transformed to Cartesian to determine x, y, and z translation of code 1302 relative to the vehicle.

The camera and the position of the vehicle may be decomposed as having roll, pitch, and yaw rotations relative to the code. In some embodiments, a vehicle may include an onboard inertial measurement unit that provides roll, pitch, and yaw. Further, the vehicle may include a camera configured to maintain level orientation by zeroing out pitch and roll corrections from the vehicle. In some embodiments, the vehicle may only need four (4) degrees of freedom from the code (i.e., x, y, z translations, and a yaw rotation describing the alignment of the vehicle relative to the normal vector of the code). A vehicle may maneuver by thrust vectoring its motors, and the vehicle strafes laterally by rolling and translates forward and backward by pitching. Up and down (Gaz) corrections can be made by increasing or decreasing thrust to all motors of the vehicle. Yaw corrections may be obtained by differentially increasing thrust to diagonally opposing motors while decreasing thrust to the other pair of motors to maintain altitude.

Figures 14A, 14B:
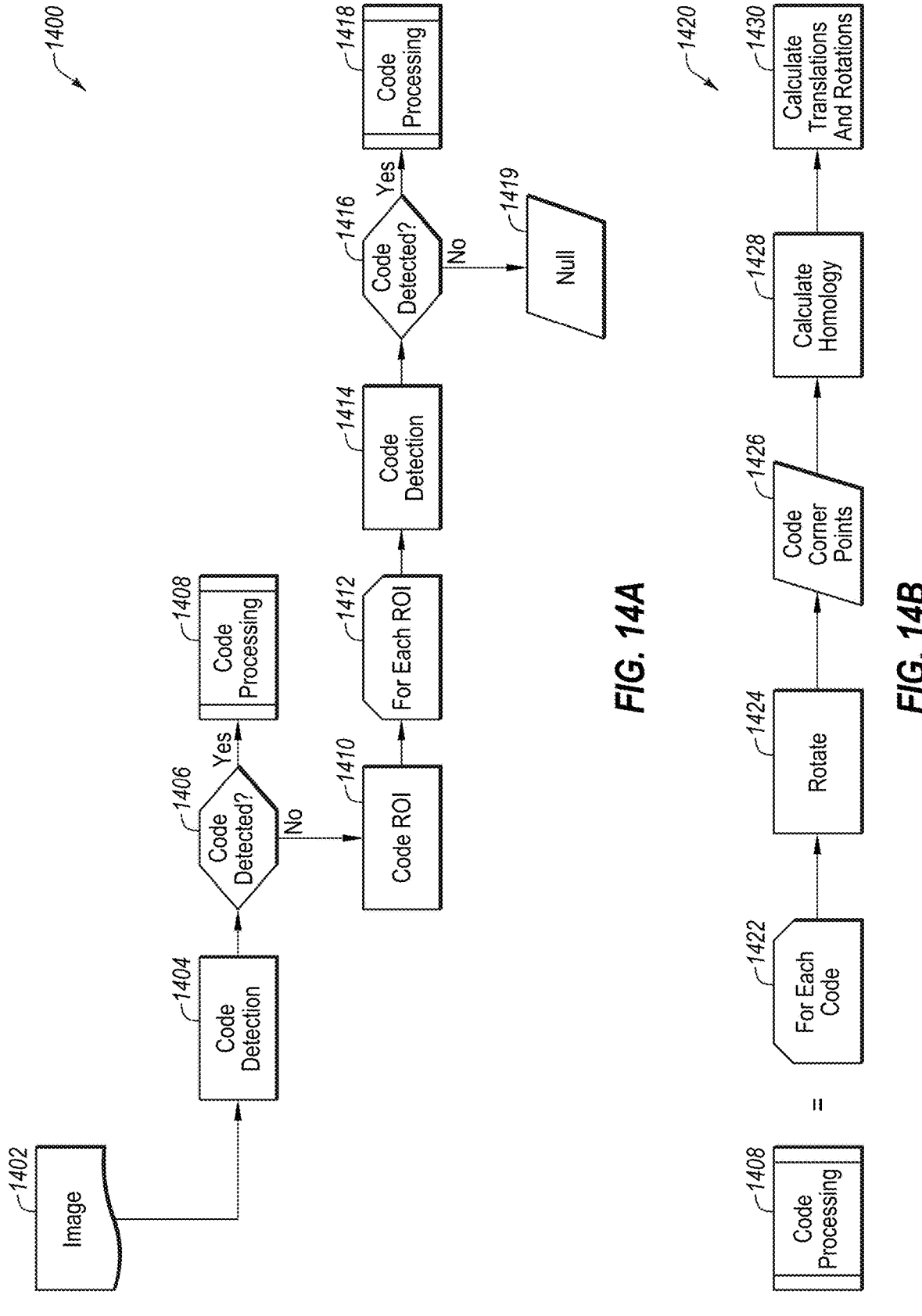
FIG. 14A depicts an example flow for identifying code locations, in accordance with various embodiments of the present disclosure.
FIG. 14B depicts an example flow for processing codes, according to various embodiments of the present disclosure.

FIG. 14A is a flowchart of an example flow 1400 of detecting a code, in accordance with various embodiments of the disclosure. Flow 1400 may be arranged in accordance with at least one embodiment described in the present disclosure. Flow 1400 may be performed, in some embodiments, by a device or system, such as system 200 of FIG. 2, control loop 400 of FIG. 4, system 1700 of FIG. 17, or another device or system. Although illustrated as discrete blocks, various blocks may be divided into additional blocks, combined into fewer blocks, or eliminated, depending on the desired implementation.

A code detection operation may be performed on an image 1402 at block 1404. At block 1406, it may be determined whether a code is detected. If a code is detected, flow 1400 may proceed to block 1408 where code processing may be performed. If a code is not detected, flow 1400 may proceed to block 1410.

At block 1410, a code ROI detection process may be performed to identify a number of ROIs. Further, for each identified ROI 1412, a code detection operation may be performed at block 1414. At block 1416, it may be determined whether a code is detected. If a code is detected, flow 1400 may proceed to block 1418 where code processing may be performed. If a code is not detected, flow 1400 may proceed to block 1419 wherein a "null" may be generated.

As noted above, at blocks 1408 and 1418, code processing may be performed. With reference to an example flow 1420 illustrated in FIG. 14B, an example code processing operation is described. For each code 1422 of a number of detected codes, a template is rotated at block 1424 to determine corner points 1426 of the code. Further, at block 1428, homology may be calculated, and at block 1430, translations and rotations may be calculated.

Modifications, additions, or omissions may be made to flow 1400 and/or flow 1420 without departing from the scope of the present disclosure. For example, the operations of flow 1400 and/or 1420 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

To simplify the control of the vehicle, the camera of the vehicle may be treated as the vehicle's position. The vehicle's position may be controlled (e.g., via a controller) to adjust pitch, yaw, and/or Gaz to maintain the vehicle in a stable flight envelope.

According to various embodiments, a rotation value that describes the "roll" of the code (when the code is not pitched relative to the camera) may be computed. A homography shear value that measures the yaw of the code (when the code is not rolled relative to the camera) may also be computed. However, the rotation and shear components are not independent and through trigonometric identities describe the pitch, yaw, and roll of the code in space. While this mathematically precise determination of yaw is obtainable through the homography matrix, it may be simpler and faster from a practical control standpoint to quantify yaw as the relative height of one side of the code (e.g., the left side of the code) to an opposite side of the code (e.g., the right side of the code).

$$Yaw = \begin{cases} \dfrac{\text{right height}}{\text{left height}} - 1, \text{right height} \geq \text{left height} \\ -\left(\dfrac{\text{left height}}{\text{right height}} - 1\right), \text{right height} < \text{left height} \end{cases} \quad (22)$$

This estimate may yield zero (0) when the vehicle's camera is aligned with the normal vector of the code. When the vehicle is too far to the right, the estimate may yield a positive value, and when the vehicle is too far to the left, the estimate may yield a negative value.

In accordance with various embodiments, a closed loop system may be used for controlling a vehicle. The closed loop system may be configured such that vehicle movements may be determined based on a live feed of coordinates. According to some embodiments, a vehicle controller may output "-limit" if the vehicle is past the desired location, "0" if the vehicle is at the desired location, or "limit" if he vehicle is not yet at the desired location.

Figure 15:
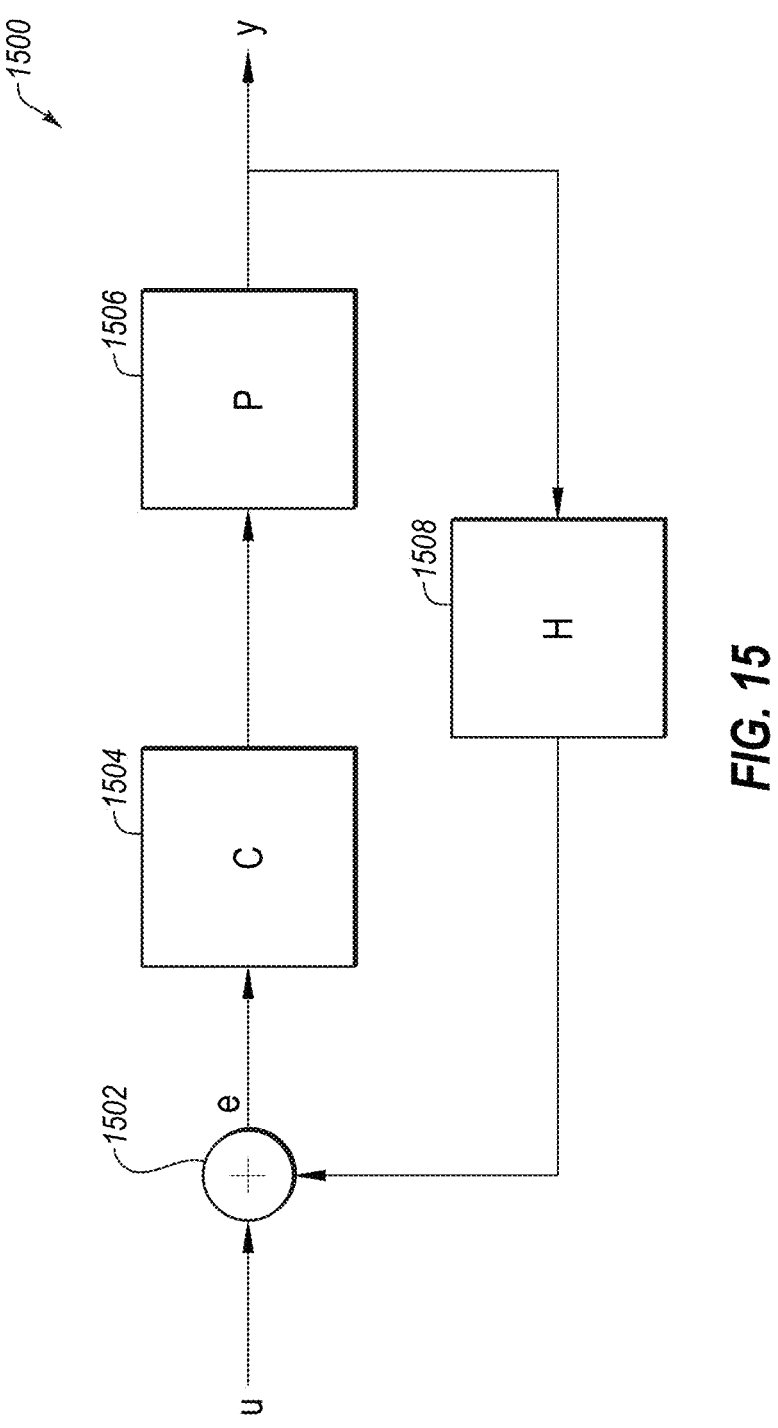
FIG. 15 depicts an example control loop, in accordance with various embodiments of the present disclosure.

FIG. 15 depicts a control loop 1500, according to various embodiments of the present disclosure. Control loop 1500, which illustrates a feedback configuration for each of the single-input-single-outputs representing the defined axes (i.e., roll, pitch, yaw, Gaz), includes a summation node 1502, a controller 1504, vehicle dynamics 1506, and sensor dynamics (e.g., a code) 1508. Controller 1504 may include, for example, a proportional-integral-derivative (PID) controller, one or more proportional-integral (PI) controllers, or a modified fifth-order loop-shaped controller. As shown in FIG. 15, a desired location u of a vehicle is provided to summation node 1502, and an actual location y of the vehicle is generated via vehicle dynamics 1506.

Figure 16:
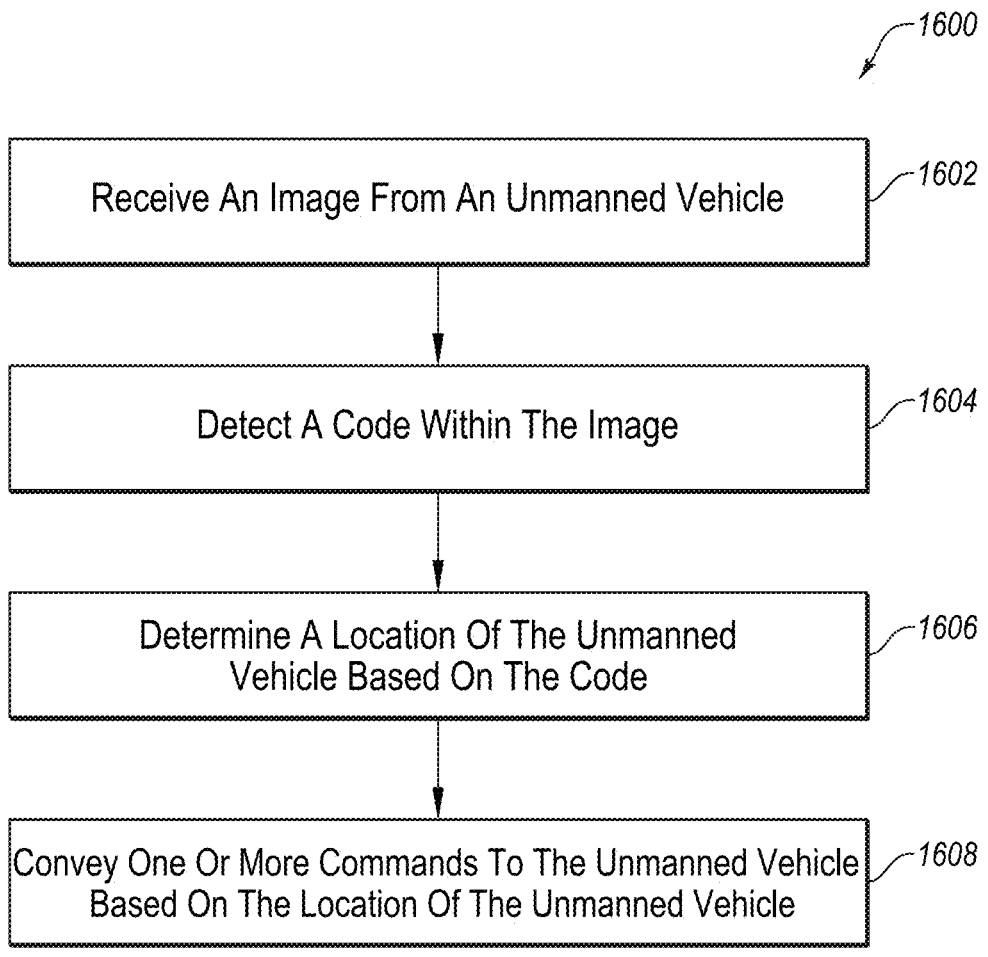
FIG. 16 is a flowchart of an example method of operating a navigation system, in accordance with various embodiments of the present disclosure.

FIG. 16 is a flowchart of an example method 1600 of operating a navigation system, in accordance with various embodiments of the disclosure. Method 1600 may be arranged in accordance with at least one embodiment described in the present disclosure. Method 1600 may be performed, in some embodiments, by a device or system, such as system 200 of FIG. 2, control loop 400 of FIG. 4, system 600 of FIG. 6, model 1100 of FIG. 11, control loop 1500 of FIG. 15, system 1700 of FIG. 17, or another device or system. Although illustrated as discrete blocks, various blocks may be divided into additional blocks, combined into fewer blocks, or eliminated, depending on the desired implementation.

Method 1600 may begin at block 1602, wherein an image may be received from an unmanned vehicle, and method 1600 may proceed to block 1604. For example, the image, which may be captured via a camera of the unmanned vehicle (e.g., vehicle 104 of FIG. 1), may be received at main module 202 of FIG. 2.

At block 1604, at least one feature (e.g., a code, such as a QR code) within the image may be detected, and method 1600 may proceed to block 1606. For example, computer vision module 206 of FIG. 2, which may include system 600 of FIG. 6, may detect the at least one feature (e.g., a QR code) within the image. As another example, one or more embodiments described with reference to FIGS. 12A-12H may be used to detect the at least one feature. For example, each feature of the at least one feature may include a known size, a known shape, a known color, a known pattern, or any combination thereof. Further, each feature of the at least one feature may be inserted within an environment (e.g., at desired locations).

At block 1606, a location of the vehicle may be determined based on the at least one feature, and method 1600 may proceed to block 1608. More specifically, for example, the location of the vehicle may be determined based on a position of the at least one feature and a position of the vehicle relative to the code. For example, the location of the vehicle may be determined via location module 208 of FIG. 2 and/or one or more of the embodiments described with reference to FIGS. 8A-10E. As another example, one or more embodiments described with reference to FIGS. 13, 14A, and 14B may be used to determine the location of the vehicle.

At block 1608, one or more commands may be conveyed to the vehicle based on the location of the vehicle. For example, one or more commands to control the vehicle (e.g., instruct the vehicle to move a certain distance (e.g., toward the code or another code)) may be conveyed to the vehicle. Further, one or more commands instructing the vehicle to perform one or more tasks (e.g., hover, capture a photo, pivot, etc.) may conveyed to the vehicle. For example, one or more of the embodiments described with reference to FIGS. 11 and 15 may be used to control the vehicle via one or more commands.

Modifications, additions, or omissions may be made to method 1600 without departing from the scope of the present disclosure. For example, the operations of method 1600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, in various embodiments, method 1600 may include one or more acts wherein the code may be decoded (e.g., to determine a location of the code). Moreover, in various embodiments, method 1600 may include one or more acts wherein a bounding box may be generated around the code.

Figure 17:
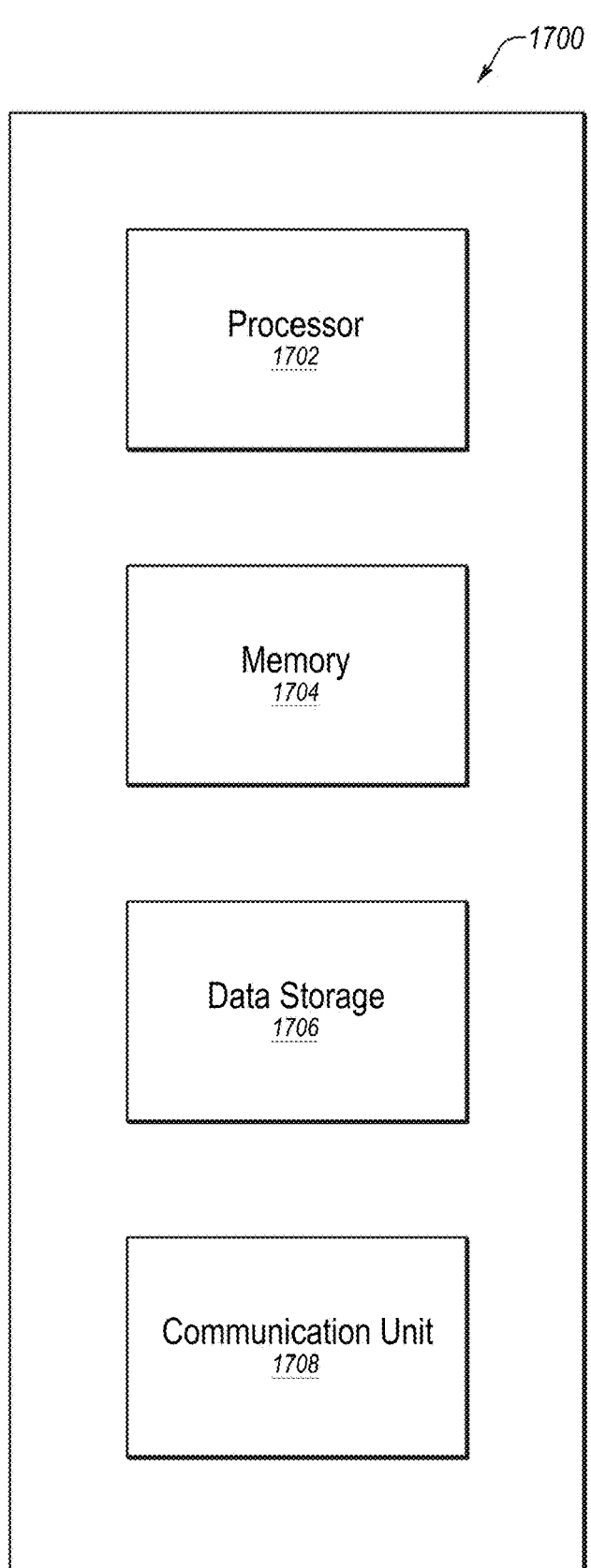
FIG. 17 illustrates an example system, which may be configured to operate according to one or more embodiments of the present disclosure.

FIG. 17 is a block diagram of an example system 1700, which may be configured according to at least one embodiment described in the present disclosure. As illustrated in FIG. 17, system 1700 may include a processor 1702, a memory 1704, a data storage 1706, and a communication unit 1708. One or more of main module 202, vehicle module 204, location module 208 and control module 210 of FIG. 2, control loop 400 of FIG. 4, and vehicle 304 of FIG. 3, or parts thereof, may be or include an instance of system 1700.

Generally, processor 1702 may include any suitable special-purpose or general-purpose computer, computing entity, or processing device including various computer hardware or software modules and may be configured to execute instructions stored on any applicable computer-readable storage media. For example, processor 1702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 17, it is understood that processor 1702 may include any number of processors. In some embodiments, processor 1702 may interpret and/or execute program instructions and/or process data stored in memory 1704, data storage 1706, or memory 1704 and data storage 1706. In some embodiments, processor 1702 may fetch program instructions from data storage 1706 and load the program instructions in memory 1704. After the program instructions are loaded into memory 1704, processor 1702 may execute the program instructions, such as instructions to perform one or more operations described in the present disclosure.

Memory 1704 and data storage 1706 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 1702. By way of example, and not limitation, such computer-readable storage media may include non-transitory computer-readable storage media including Random Access Memory (RAM), Read-Only Memory (ROM), Electrically Erasable Programmable Read-Only Memory (EEPROM), magnetic disk storage or other magnetic storage devices, flash memory devices (e.g., solid state memory devices), or any other storage medium that may be used to carry or store program code in the form of computer-executable instructions or data structures and which may be accessed by a general-purpose or special-purpose computer. Computer-executable instructions may include, for example, instructions and data configured to cause processor 1702 to perform a certain operation or group of operations e.g., related to embodiments disclosed herein.

Communication unit 1708 may be configured to provide for communications with other devices e.g., through RF transmissions. For example, communication unit 1708 may be configured to transmit to and receive signals from an unmanned vehicle. Communication unit 1708 may include suitable components for communications including, as non-limiting examples, a radio, one or more antennas, one or more encoders and decoders, and/or a power supply.

Additional non-limiting embodiments of the disclosure include:

Embodiment 1: a navigation system, comprising: one or more processors configured to communicatively couple with an unmanned vehicle within an environment, the one or more processors further configured to: receive an image from the unmanned vehicle; detect one or more codes depicted within the image; determine a location of the unmanned vehicle based on the one or more codes; and convey one or more commands to the unmanned vehicle based on the location of the unmanned vehicle.

Embodiment 2: the device of Embodiment 1, wherein the code is sought within the region surrounding the last found code region.

Embodiment 3: the device of any of Embodiments 1 and 2, wherein the view/distortion and location of the code is the image is used to estimate the relative distance and angles of the vehicle with respect to the code.

Embodiment 4: the device of any of Embodiments 1 to 3, wherein the angles and distance of the drone with respect to the code is calculated by means of geometrical projections of the code with respect to the vehicle various planes and comparing the projections with the pixel-based dimensions of the code in the image.

Embodiment 5: the device of any of Embodiments 1 to 4, wherein the angles and distance of the drone with respect to the code is calculated by means of comparing the ratio of the code dimensions and the associated angles to virtually or experimentally generated dimensions and angles.

Embodiment 6: the device of any of Embodiments 1 to 5, wherein the location and/or navigation information is configured into and extracted from the code data that are decoded by the vehicle.

Embodiment 7: the device of any of Embodiments 1 to 6, wherein the code is identified by a visual feature and is mapped to the location and/or navigation information and instructions by a mapping table.

Embodiment 8: the device of any of Embodiments 1 to 7, wherein the code contains route update information to update a mapping table.

Embodiment 9: the device of any of Embodiments 1 to 8, wherein the code contains detour information that are used for a certain period of time.

Embodiment 10: the device of any of Embodiments 1 to 9, wherein the vehicles is considered in a desired location within an allowable location tolerance after a certain number frames are analyzed to determine that the vehicle is within the tolerance.

Embodiment 10: a method, comprising: receiving an image from a vehicle positioned within an environment; detecting at least one code within the image; determining a location of the vehicle based on the at least one code; and conveying one or more commands to the vehicle based on the location of the vehicle.

Embodiment 11: the method of Embodiment 10, wherein the command is based on observing the vehicle movement to various command to determine what is the suitable thrust and angle will result in the desired location change.

Embodiment 12: the method of any of Embodiments 10 and 11, wherein the observations of vehicle performance is used to update the magnitude of each command as the vehicle is flown.

Embodiment 13: the method of any of Embodiments 10 to 12, further comprising applying at least one filter to the image.

Embodiment 14: the method of any of Embodiments 10 to 13, further comprising combing filtered images to determine potential regions in a heatmap.

Embodiment 15: the method of any of Embodiments 10 to 14, further comprising positioned codes with known sizes within the environment.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various detector types and configurations.

What is claimed is:

1. A navigation system, comprising:
one or more processors configured to communicatively couple with an unmanned vehicle, the one or more processors further configured to:
   receive an image from the unmanned vehicle;
   detect one or more features of a number of features inserted into a non-GPS environment and depicted within the image;
   determine a location of the unmanned vehicle based on the one or more features and a number of pixels of the one or more features depicted within the image;
   cause, based on the location of the unmanned vehicle, one or more commands to be conveyed, via wireless communication, to the unmanned vehicle to position the unmanned vehicle at a desired location; and
   in response to the unmanned vehicle being positioned at the desired location, cause at least one additional command to be conveyed, via wireless communication, to the unmanned vehicle to perform a task while positioned at the desired location.

2. The navigation system of claim 1, further comprising a first module including at least one processor of the one or more processors, the first module configured to:
   receive the image from the unmanned vehicle;
   detect the one or more features within the image;
   generate a bounding box around at least one feature of the one or more features; and
   decode information stored in the at least one feature.

3. The navigation system of claim 2, wherein the first module includes at least one of a deep learning module and a machine learning module configured to receive the image, identify the one or more features, and generate the bounding box around the at least one feature.

4. The navigation system of claim 2, wherein the one or more processors are further configured to at least one of crop or resize the bounding box in response to dimensions of the image exceeding a predetermined maximum size.

5. The navigation system of claim 2, wherein the one or more processors are further configured to filter the image.

6. The navigation system of claim 2, further comprising a second module including at least one processor of the one or more processors, the second module configured to:
   receive the at least one feature including the bounding box; and
   determine the location of the unmanned vehicle relative to the at least one feature based on a view of the at least one feature.

7. The navigation system of claim 6, wherein the second module is further configured to determine a number of view angles and a relative distance between the unmanned vehicle and known location of the one or more features to determine the location of the unmanned vehicle.

8. The navigation system of claim 6, further comprising a third module including at least one processor of the one or more processors, the third module configured to:
   receive the location of the unmanned vehicle; and
   generate the one or more commands to be conveyed, via wireless communication, to the unmanned vehicle based on a difference between the location of the unmanned vehicle and a desired location of the unmanned vehicle.

9. The navigation system of claim 1, wherein each feature of the number of features comprise either a quick response (QR) code or a bar code.

10. The navigation system of claim 1, further comprising the unmanned vehicle including a camera configured to capture the image.

11. A method, comprising:
positioning a number of features within a non-GPS environment;
receiving an image from a vehicle;
detecting at least one feature of the number of features within the image;
determining a location of the vehicle based on the at least one feature and a number of pixels of the at least one feature depicted within the image;
conveying, via wireless communication and based on the location of the vehicle, one or more commands to the vehicle to position the vehicle at a desired location; and
conveying, via wireless communication and in response to the vehicle being positioned at the desired location, at least one additional command to the vehicle to perform a task while positioned at the desired location.

12. The method of claim 11, further comprising decoding the at least one feature to determine a location of the at least one feature.

13. The method of claim 12, wherein determining the location of the vehicle comprises determining the location of the vehicle relative to the location of the at least one feature.

14. The method of claim 11, wherein determining the location of the vehicle comprises determining one or more angles between the vehicle and the at least one feature within the image and a relative distance between the vehicle and the location of the at least one feature to determine the location of the vehicle.

15. The method of claim 11, further comprising generating a bounding box around the at least one feature in response to detecting the at least one feature.

16. The method of claim 11, wherein determining the location comprises determining the location based on two or more features in the image.

17. The method of claim 11, wherein determining the location of the vehicle based on the at least one feature comprises comparing known dimensions and a shape of a feature to the at least one feature within the image.

18. The method of claim 11, wherein conveying, via wireless communication, the one or more commands comprises conveying one or more of a roll input, a pitch input, a yaw input, and a throttle input to the vehicle based on the location of the vehicle.

19. The method of claim 11, wherein detecting the at least one feature within the image comprises detecting the at least one feature via at least one of a brightness, a shape, a size, and an orientation of the at least one feature.

20. The method of claim 11, further comprising controlling the vehicle via one or more navigation techniques selected from the group consisting of one or more of:
   simultaneous localization and mapping (SLAM), target tracking, and global positioning.

* * * * *